United States Patent
Stewart

(10) Patent No.: US 10,921,096 B2
(45) Date of Patent: Feb. 16, 2021

(54) MOUNTING AND FASTENING SYSTEM AND MOUNTING ADAPTER

(71) Applicants: Robert E. Stewart, Farmington Hills, MI (US); Nicholas Strumbos, Birmingham, MI (US)

(72) Inventor: Robert E. Stewart, Farmington Hills, MI (US)

(73) Assignees: Robert E. Stewart, Farmington Hills, MI (US); Nicholas Strumbos, Birmingham, MI (US)

( * ) Notice: Subject to any disclaimer, the term of this patent is extended or adjusted under 35 U.S.C. 154(b) by 141 days.

(21) Appl. No.: 16/142,722

(22) Filed: Sep. 26, 2018

(65) Prior Publication Data

US 2019/0101361 A1    Apr. 4, 2019

Related U.S. Application Data

(60) Provisional application No. 62/566,407, filed on Sep. 30, 2017.

(51) Int. Cl.
*F41H 5/013* (2006.01)
*F41H 7/00* (2006.01)
(Continued)

(52) U.S. Cl.
CPC .............. *F41H 5/013* (2013.01); *B60R 11/00* (2013.01); *B62D 27/065* (2013.01);
(Continued)

(58) Field of Classification Search
CPC ..... F41H 5/013; F16B 5/02; B60R 2011/0052
See application file for complete search history.

(56) References Cited

U.S. PATENT DOCUMENTS

| 860,829 | A * | 7/1907 | Schmidt | ............... B26B 21/06 |
| | | | | 30/32 |
| 3,178,984 | A * | 4/1965 | Barothy | ............... F16B 35/04 |
| | | | | 83/637 |

(Continued)

FOREIGN PATENT DOCUMENTS

WO    WO20081274272 A1    10/2008

OTHER PUBLICATIONS

Hansen; United States Statutory Invention Registration No. H129, Sep. 2, 1986, 6 pages.

*Primary Examiner* — Bradley Duckworth
(74) *Attorney, Agent, or Firm* — Reising Ethington P.C.

(57) ABSTRACT

A mounting and fastening system includes a mounting adapter configured to adapt mounting of a second component with respect to a first component, and having a radially inward portion including a throughbore, and a radially outward portion with a tapered outward surface that tapers in an axially inboard and radially inward direction and that cooperates with a tapered surface of the second component and such that an adapter inboard surface faces a first outboard surface of the first component. A mounting bolt for a mounting a fastening system includes: a head including flat opposite sides and semi-cylindrical opposite sides interposed between the flat opposite sides; a shank extending from the head; an external thread on at least a portion of the shank; a passage extending through the head and into at least a portion of the shank; and an internal thread in at least a portion of the passage.

17 Claims, 16 Drawing Sheets

(51) Int. Cl.
*B60R 11/00* (2006.01)
*F41H 7/02* (2006.01)
*B62D 27/06* (2006.01)
*F16M 13/02* (2006.01)
*F16B 5/02* (2006.01)
*F16B 2/06* (2006.01)
*F16B 2/14* (2006.01)
*B60R 9/00* (2006.01)

(52) U.S. Cl.
CPC .............. *F16M 13/02* (2013.01); *F41H 7/00* (2013.01); *F41H 7/02* (2013.01); *B60R 9/00* (2013.01); *B60R 2011/0052* (2013.01); *F16B 2/065* (2013.01); *F16B 2/14* (2013.01); *F16B 5/02* (2013.01); *F16B 2200/30* (2018.08)

(56) References Cited

U.S. PATENT DOCUMENTS

| | | | |
|---|---|---|---|
| 3,195,156 A | 7/1965 | Phipard, Jr. | |
| 3,918,345 A | 11/1975 | Phipard, Jr. | |
| 3,978,760 A | 9/1976 | Muenchinger | |
| 4,304,503 A | 12/1981 | Gehring et al. | |
| 4,738,184 A | 4/1988 | Böhne et al. | |
| 4,929,137 A * | 5/1990 | Bossenmaier | B65D 55/02 411/501 |
| 5,033,357 A * | 7/1991 | Seksaria | F16B 5/0233 403/167 |
| 5,141,357 A * | 8/1992 | Sherman | F16B 5/025 403/4 |
| 5,242,253 A | 9/1993 | Fulmer | |
| 5,370,034 A | 12/1994 | Turner et al. | |
| 5,600,084 A | 2/1997 | Gonzalez | |
| 5,670,734 A * | 9/1997 | Middione | F41H 5/013 296/187.07 |
| 6,082,240 A | 7/2000 | Middione et al. | |
| 6,854,921 B2 | 2/2005 | Melberg et al. | |
| 7,056,053 B2 | 6/2006 | Schilling et al. | |
| 7,083,190 B2 * | 8/2006 | Clark | F16B 41/002 280/734 |
| 7,458,306 B2 | 12/2008 | Singh et al. | |
| 7,877,948 B2 * | 2/2011 | Davies | B60R 13/01 52/506.05 |
| 8,267,003 B1 | 9/2012 | Lou et al. | |
| 8,312,606 B2 * | 11/2012 | Reid | B23P 11/00 29/263 |
| 8,480,150 B2 | 7/2013 | Medwell et al. | |
| 8,875,368 B2 * | 11/2014 | O'Sullivan | F16B 31/021 29/426.2 |
| 8,920,089 B1 * | 12/2014 | Stewart | F16B 5/0258 411/112 |
| 9,091,511 B2 | 7/2015 | Shmargad | |
| 9,738,792 B2 | 8/2017 | Stupar et al. | |
| 9,895,839 B2 * | 2/2018 | Ogawa | B29C 65/48 |
| 10,132,342 B2 * | 11/2018 | Mori | B29C 65/48 |
| 10,329,008 B2 * | 6/2019 | Walker | B64C 3/26 |
| 10,442,473 B2 * | 10/2019 | Erlacher | B60K 1/04 |
| 10,487,864 B2 * | 11/2019 | Schmidt | F16B 5/02 |
| 10,590,972 B2 * | 3/2020 | Mateo | F16B 5/0225 |
| 2006/0251496 A1 * | 11/2006 | Wood | F16B 5/02 411/507 |
| 2009/0180831 A1 * | 7/2009 | Kendall | F16B 5/025 403/408.1 |
| 2010/0282062 A1 | 11/2010 | Sane et al. | |
| 2010/0322738 A1 * | 12/2010 | Lau | F16B 37/125 411/17 |
| 2014/0023456 A1 | 1/2014 | Allor et al. | |
| 2019/0101150 A1 * | 4/2019 | Stewart | F16B 31/028 |

\* cited by examiner

MOUNTING AND FASTENING SYSTEM AND MOUNTING ADAPTER

TECHNICAL FIELD

This disclosure relates generally to mechanical engineering systems and components and, more particularly, to mounting systems, fastening systems, and related mounting and fastening components.

BACKGROUND

Simple mounting and fastening systems include a first component having an outboard surface with an internally threaded hole, and a second component having an inboard surface located against the outboard surface of the first component, an oppositely disposed outboard surface, and a throughbore therebetween and axially aligned with the internally threaded hole of the first component. Such systems also include a fastener having a shank that extends through the throughbore in the second component and that has an externally threaded portion threaded into the internally threaded hole, and also having an enlarged head engaged either directly against the outboard surface of the second component or indirectly via an annular washer circumscribing the shank.

Such systems are ancient, and work very well for many applications. But in other applications, an area of fastener clamp loading is too small to prevent loosening of the system due to vibration or thermal cycling. And some applications are subjected to forces so sudden and so great that the fasteners plastically stretch, fracture, or otherwise fail, thereby potentially resulting in separation of the fastened components. In a non-limiting example, systems for mounting and fastening ballistics deterrent equipment on armored-vehicles are subjected to wide range dynamic forces from ballistic events from bullets, rocket-propelled grenades, projectiles from mines and improvised explosive devices, and other ballistic projectiles. Such forces can compromise the integrity of the fasteners, such that the fasteners fail to constrain the ballistics deterrent equipment and may expose an armored-vehicle to complete penetration from subsequent ballistic projectiles.

Traditional solutions to such problems include increasing the size, quantity, and/or material quality of the fasteners. But such solutions may result in designs that are too costly, too heavy, too unreliable, or otherwise insufficient.

SUMMARY OF THE DISCLOSURE

In accordance with an embodiment, a mounting and fastening system includes: a first component including a first outboard surface having a threaded hole with a threaded hole axis; and a second component including a second inboard surface facing the first outboard surface of the first component, a second outboard surface, and a second tapered surface extending between the second outboard and inboard surfaces and that tapers in an axially inboard and radially inward direction. The system also includes a mounting adapter configured to adapt mounting of the second component with respect to the first component, and including: a radially inward portion including a throughbore having a throughbore axis; an inboard end including an adapter inboard surface extending transversely with respect to the throughbore axis; an outboard end including an adapter outboard surface extending transversely with respect to the throughbore axis; and a radially outward portion having a tapered outward surface that tapers in an axially inboard and radially inward direction and cooperates with the second tapered surface such that the adapter inboard surface of the mounting adapter faces the first outboard surface of the first component.

In accordance with another embodiment, a mounting and fastening system mounting bolt includes: a head including flat opposite sides and semi-cylindrical opposite sides interposed between the flat opposite sides; a shank extending from the head; an external thread on at least a portion of the shank; a passage extending through the head and into at least a portion of the shank; and an internal thread in at least a portion of the passage.

DETAILED DESCRIPTION

In general, mounting and fastening systems and related mounting and fastening components will be described using one or more examples of illustrative embodiments of the systems and components in an illustrative environment: an armor mounting and fastening system. However, it will be appreciated as the description proceeds that the disclosed inventions are useful in many different applications and may be implemented in many other embodiments. As used herein, the term "may" is an expedient merely to indicate optionality, for instance, of an element, feature, or other thing, and cannot be reasonably construed as rendering indefinite any disclosure herein.

One or more of the embodiments disclosed below may provide improved techniques for engineered ballistics-reactive fastening for attaching armor and the like to various vehicles, as discussed below. Engineered fastening and mounting systems protect fasteners from ballistics events, while dissipating ballistic energy, and without compromising fundamental armor attachment principles.

With previous methods, armor is attached to a vehicle using a simple bolt and heavy washer that thread through holes in the armor into threaded bosses. Such methods present several potential issues. First, minimal surface contact between the washer and the armor may limit the amount of clamp load that can be applied to a panel without damaging/cracking the panel. Accordingly, such panels are attached with low clamp loads that may not be adequate to prevent loosening due to vibration or thermal cycling. Second, there is little to no lateral support for attachment of the bolt. So, for instance, if an exposed bolt head is struck by a bullet from any angle it may shear off and release its attachment of the armor.

Figure 1:
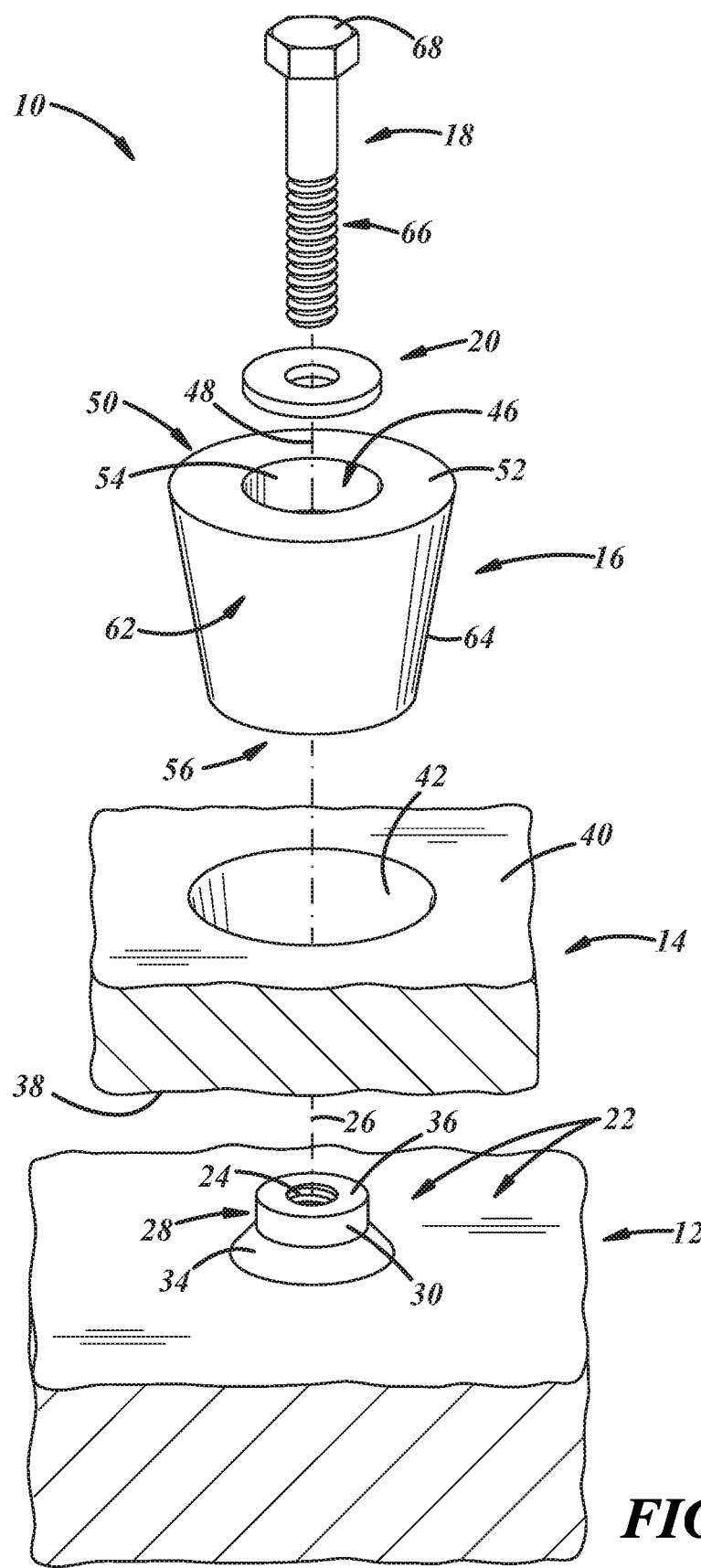
FIG. 1 is a fragmentary, exploded, perspective view according to an illustrative embodiment of a mounting and fastening system including a mounting adapter configured to be fastened to a first component and to adapt mounting of a second component to the first component.
Figure 2:
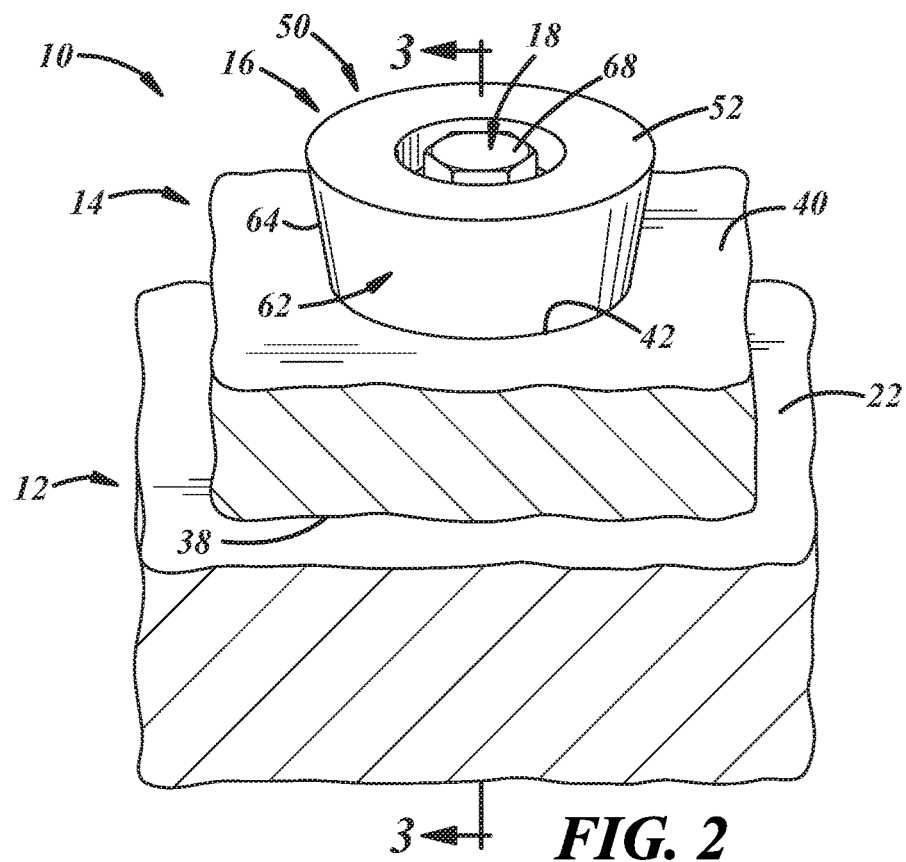
FIG. 2 is a fragmentary, assembled, perspective view of the mounting and fastening system of FIG. 1.
Figure 3:
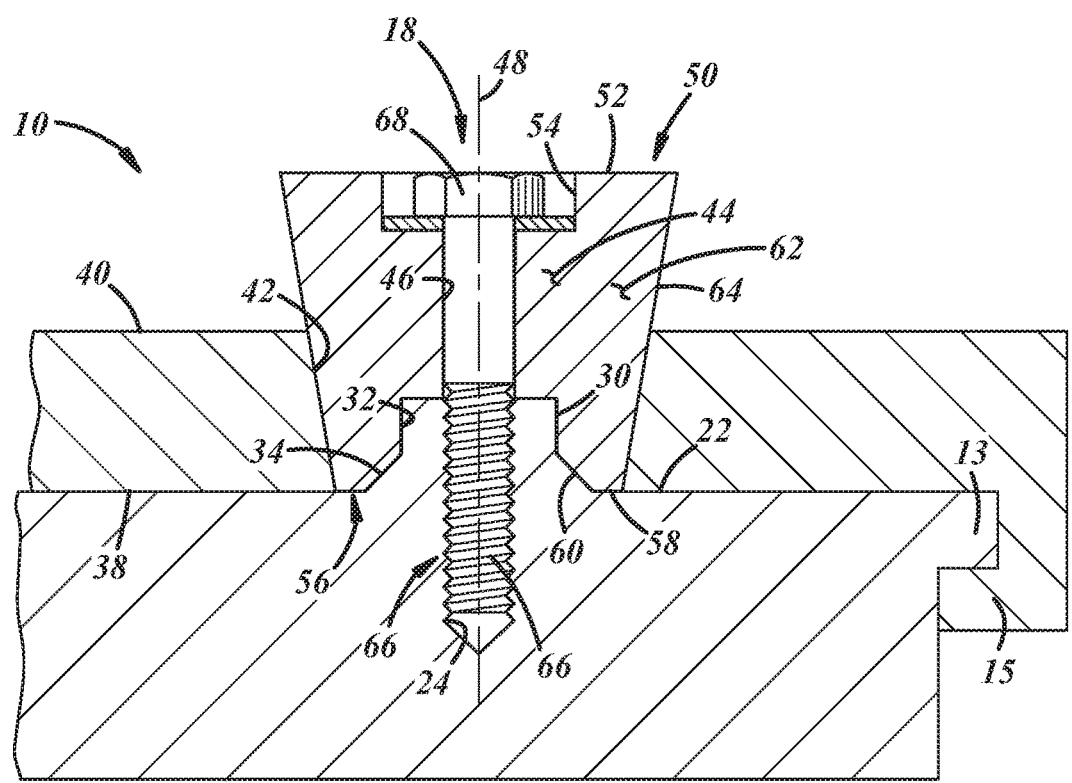
FIG. 3 is a fragmentary, cross-sectional view of the mounting and fastening system of FIG. 1, taken along line 3-3 of FIG. 2.

Referring specifically to the drawings, FIGS. 1-3 show an illustrative embodiment of a mounting and fastening system 10. The system 10 may include a base or first component 12, and an appliqué or second component 14 configured to be coupled to the first component 12. Also, the system 10 includes an illustrative embodiment of a mounting adapter 16 configured to be coupled to the first component 12 and to adapt mounting of the second component 14 to the first component 12. Additionally, the system 10 includes a bolt 18 configured to extend through the mounting adapter 16 and to be threadably fastened to the first component 12, and a washer 20 configured to circumscribe a portion of the bolt 18 and to engage the mounting adapter 16.

The first component 12 includes a first outboard surface 22 having a threaded hole 24 with a threaded hole axis 26. The first component 12 includes a mounting boss 28 establishing part of the first outboard surface 22 and including a cylindrical outward surface 30 configured to cooperate with an inboard counterbore 32 (FIG. 3) of the mounting adapter 16. The outboard surface 22 of the first component 12 also includes an externally sloped surface 34 at a boss outboard end 36 of the mounting boss 16. The sloped surface 34 may be a circumferentially continuous surface, and may include a straight-tapered external chamfer, a rounded fillet, or a sloped surface of any other suitable sloped shape. The mounting boss 16 may include a weldment, for instance, an internally threaded cylinder welded to, what may be an otherwise flat, outboard surface 22 of the first component 12. In a non-limiting example, the first component 12 may include, or be a part of, a frame, body, hull, or other like portion of a vehicle, for instance, an armored tank, ship, aircraft, or the like.

The second component 14 includes a second inboard surface 38 facing the first outboard surface 22 of the first component 12, a second outboard surface 40, and a second tapered surface 42 extending between the second outboard and inboard surfaces 38, 40 and that tapers in an axially inboard and radially inward direction. In the illustrated embodiment, the second tapered surface 42 may be incurvate, or circular in transverse cross section, and part of a frustoconical passage through the second component 14. In other embodiments, the second tapered surface 42 may be of any suitable shape. In a non-limiting example, the second component 14 may include, or be a part of, ballistics-deterrent equipment, for instance, an armor panel, a deployable deflector, an explosive ballistics-reactive device, or the like. The second component 14 may be composed of metal, for instance, tempered aluminum or steel, or composites, or ceramics, or any other material suited for resistance to shock and impact from ballistics projectiles.

In the illustrated embodiment, the first and second components 12, 14 are in direct contact with one another. Additionally, the first and second components 12, 14 may be provided with corresponding interengagement features 13, 15, for example, an edge of a vehicle body panel that extends beyond an adjacent body panel to create an attachment key for a corresponding keyway in an armor panel. The interengagement features 13, 15 may cooperate such that the armor panel may be hung onto the vehicle. For instance, in the illustrated embodiment, the first and second components 12, 14 may be interengaged, for example, via a tongue-and-groove configured features 13, 15 as exemplified in FIG. 3, or via interengagement of dovetail features, interdigitated features, or the like. But in other embodiments, the first and second components 12, 14 need not be in direct contact with one another, such that they may be axially spaced apart. Likewise, in other embodiments, the first and second components 12, 14 need not be interengaged.

The mounting adapter 16 may be of unitary construction, and may be composed of the same material as the second component 14, or of any other material suitable for use in any particular application. In any case, the mounting adapter 16 may be configured to adapt mounting of the second component 14 with respect to the first component 12.

The mounting adapter 16 includes a radially inward portion 44 including a throughbore 46 having a throughbore axis 48 and being configured to carry the bolt 18 therein.

The mounting adapter 16 further includes an outboard end 50 including an adapter outboard surface 52 extending transversely with respect to the axis 48, and also may include an outboard counterbore 54 in the adapter outboard surface 52. As used herein, the terminology "transversely" may include perpendicularly disposed, or otherwise acutely or obtusely disposed at any suitable non-zero angle with respect to a suitable reference axis or plane, for instance, the throughbore axis 48.

The mounting adapter 16 also includes an inboard end 56 including an adapter inboard surface 58 extending transversely with respect to the axis 48, and also may include the inboard counterbore 32 in the adapter inboard surface 58 in communication with the throughbore 46. The inboard end 56 further may include an internally sloped surface 60 between the inboard counterbore 32 and the inboard surface 58. The internally sloped surface 60 may be a fully circumferentially continuous surface and may include a straight-tapered internal chamfer, rounded fillet, or the like. In any event, the internally sloped surface 60 may cooperate with the corresponding externally sloped surface 34 of the mounting boss 16, for example, for locating the second component 14 to the first component 12. Also, the adapter inboard surface 58 may be in contact with the first outboard surface 22 of the first component 12. Additionally, the inboard counterbore 32 may fit snugly over the outside diameter of the mounting boss 36.

With respect to FIG. 3, the mounting adapter 16 further includes a radially outward portion 62 having a tapered outward surface 64 that tapers in an axially inboard and radially inward direction. The tapered outward surface 64 may be excurvate, or circular in transverse cross section, and, thus, frustoconical, such that the adapter is of truncated conical shape. In other embodiments, the tapered outward surface 64 may be of any suitable tapered shape. In any case, the mounting adapter 16 may be configured such that the tapered outward surface 64 of the mounting adapter 16 cooperates with the second tapered surface 42 of the second component 14, and such that the adapter inboard surface 58 of the mounting adapter 16 faces the first outboard surface 22 of the first component 12, and may contact that surface 22.

The mounting adapter 16 may have any dimensions suitable for a particular application, but some illustrative dimensions follow. A conical opening angle of the mounting adapter 16 may be between 10 degrees and 45 degrees, including all ranges, sub-ranges, endpoints, and values in that range including the illustrated angle. An axial depth of the inboard counterbore 32 may be between 4 mm and 20 mm, including all ranges, sub-ranges, endpoints, and values in that range. The axial depth of the inboard counter bore 32 may be matched to the height of the mounting boss 28. The height of this fit up between the two components provides resistance to side impact forces. By increasing this height resistance to side loads can be increased to protect the bolt 18 from shear forces that can cause bolt fracture. The height relationship can be adjusted, for example, to fine tune a precise shear load resistance required for an application or to resist a specific caliber of ballistic impact.

In the illustrative vehicle armor application, to laterally locate an armor panel and to clamp the armor panel securely in place, the presently disclosed mounting adapter 16 can be applied thereto, for example, such that there may be a limited and controlled clearance between the corresponding tapered surfaces, for instance, to allow for vehicle fabrication variation.

The bolt 18 may be of unitary construction, and may be composed of metal, for instance, steel or aluminum, or may be composed of any other material suitable for a particular purpose. In any case, the bolt 18 includes a shank 66 extending through the throughbore 46 of the mounting adapter 16 and having an externally threaded portion threaded into the threaded hole 24 of the first component 12, and includes a head 68 that may be carried in the outboard counterbore 54 of the mounting adapter 16 as shown in the illustrated embodiment. In other embodiments, the head 68 may be carried against the outboard surface 52 of the mounting adapter 16.

The bolt 18 through the mounting adapter 16 can be fully torqued to clamp load specification for the size of that particular bolt 18. The mounting adapter 16 may resist ballistics impact forces from all directions, for example, because of its engagement onto the outside of the mounting boss 28. This configuration may prevent the bolt 18 from being sheared off, by supporting and capturing the bolt 18 within the mounting adapter 16.

The washer 20 may be of flat, unitary construction, and may be composed of metal, for instance, steel, titanium, or aluminum, or may be composed of ballistics resistant composite, or any other material suitable for a particular purpose. In any case, the washer may be disposed between the bolt head 68 and the mounting adapter 16. In this embodiment, the washer 20 may be used to distribute forces, surface protection of the mounting adapter 16, or for any other suitable reason. In other embodiments, the washer 20 may be of wave spring, bell spring, or of any other suitable shape and type, including the type disclosed in the following embodiment.

Figure 4:
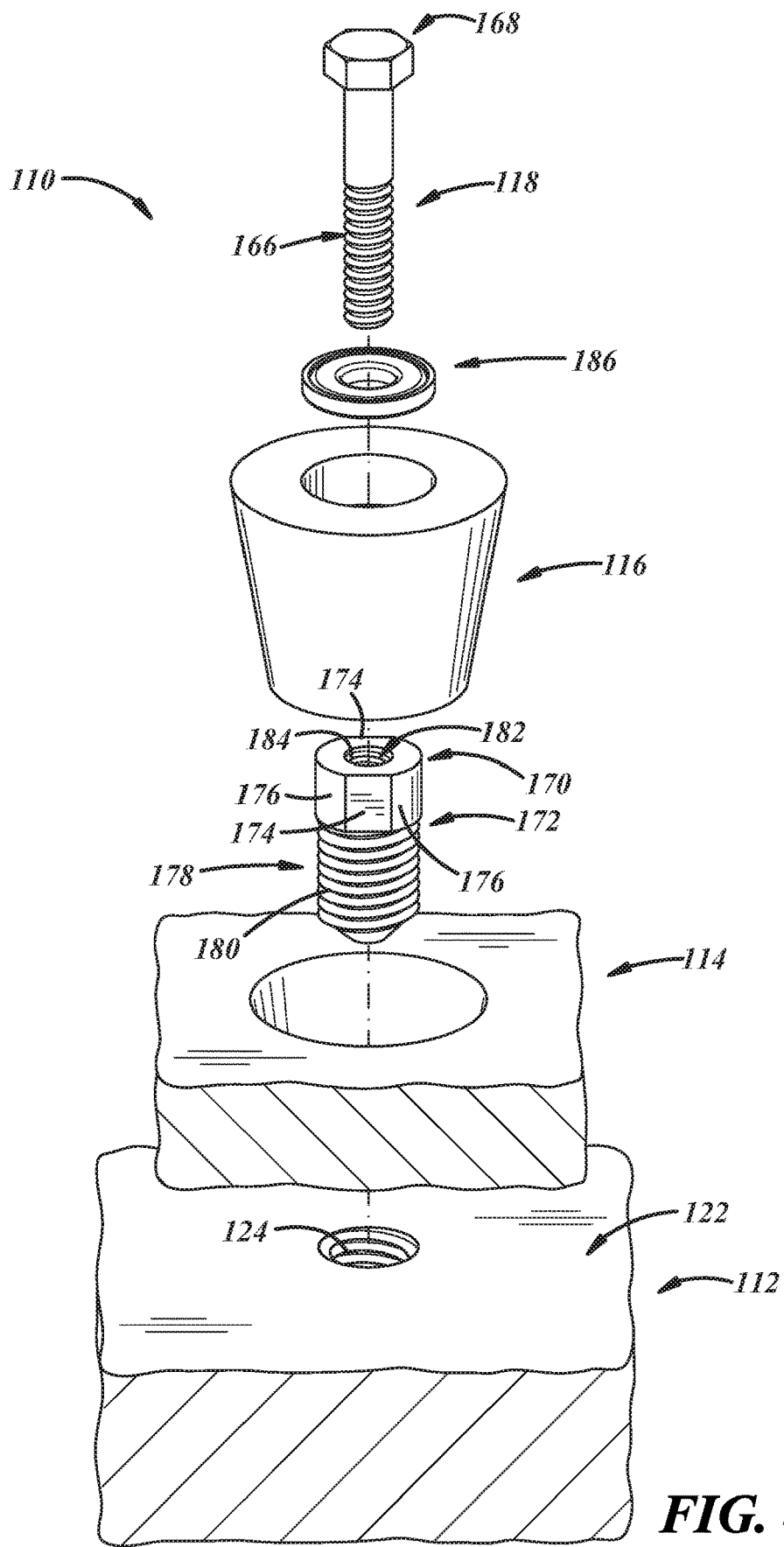
FIG. 4 is a fragmentary, exploded, perspective view according to another illustrative embodiment of a mounting and fastening system.
Figure 5:
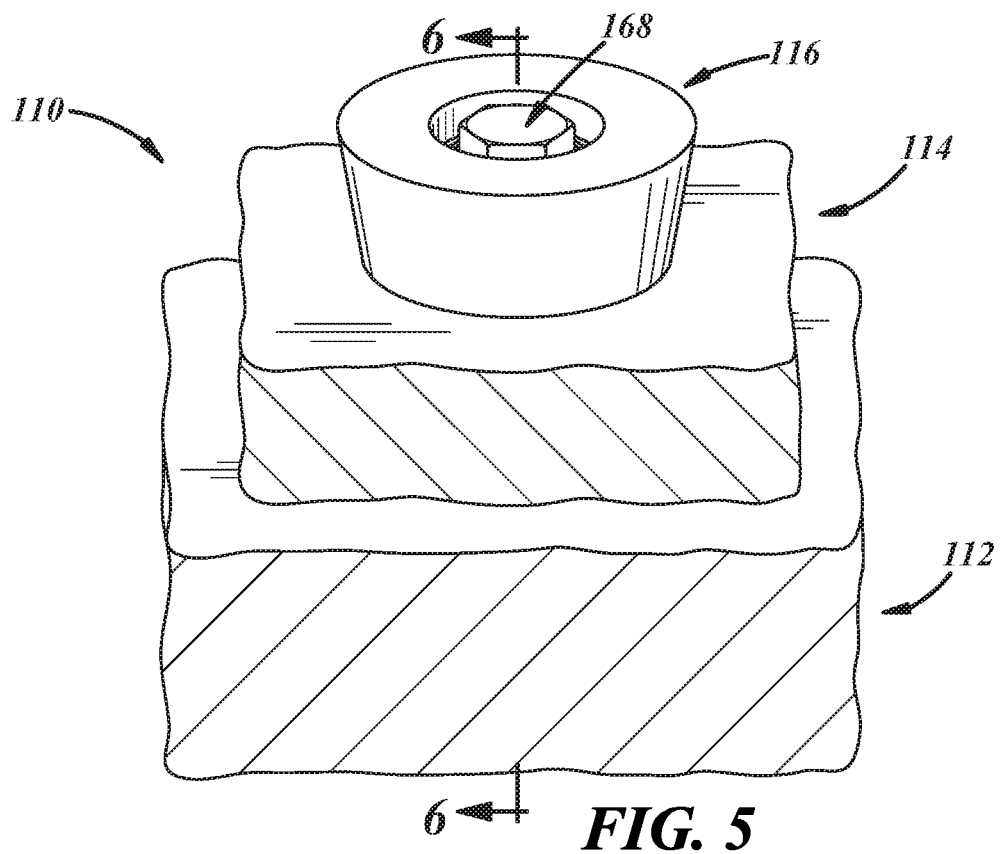
FIG. 5 is a fragmentary, assembled, perspective view of the mounting and fastening system of FIG. 4.
Figure 6:
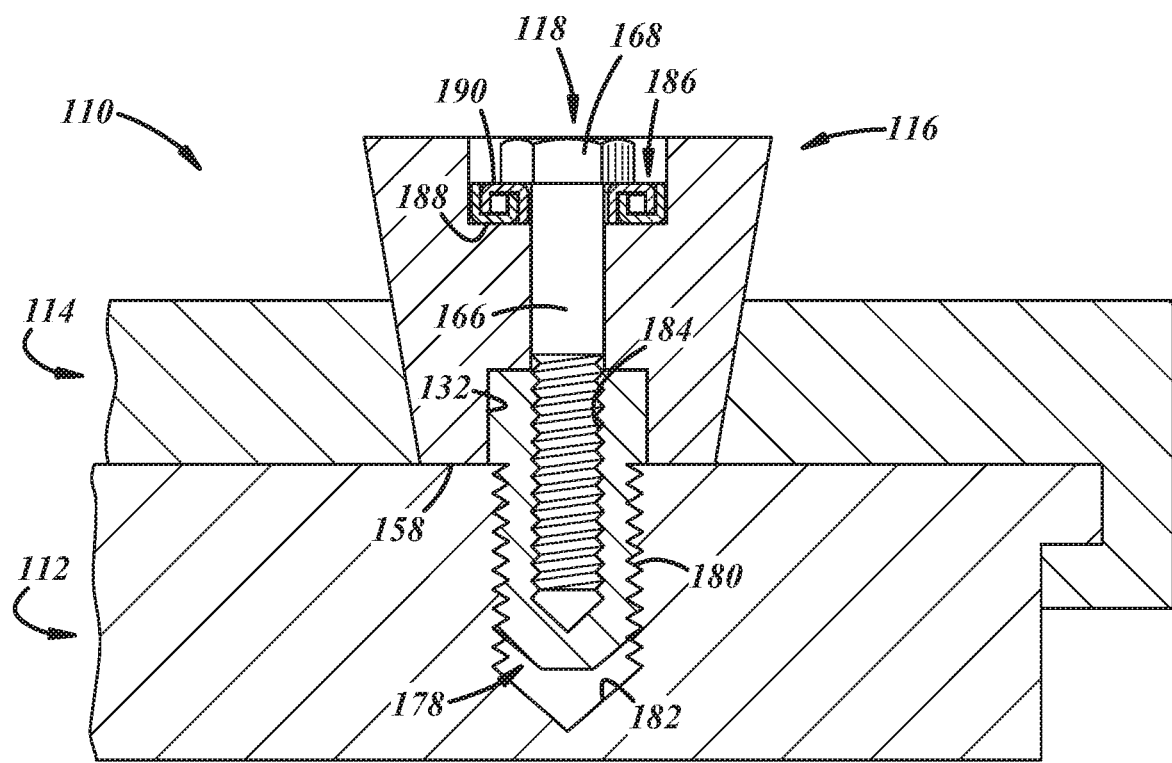
FIG. 6 is a fragmentary, cross-sectional view of the mounting and fastening system of FIG. 4, taken along line 6-6 of FIG. 5.

FIGS. 4-6 show another illustrative embodiment of a mounting and fastening system 110. This embodiment is similar in many respects to the embodiment of FIGS. 1-3 and like numerals between the embodiments generally designate like or corresponding elements throughout the several views of the drawing figures. Accordingly, the descriptions of the embodiments are hereby incorporated into one another, and description of subject matter common to the embodiments generally may not be repeated.

In this embodiment, a first component 112 includes an outboard surface 122 and a threaded passage 124 therein. Instead of a weldment, a mounting adapter 116 includes a head 170 of a mounting bolt 172 threaded into the threaded passage 124.

The bolt 118 may be of unitary construction and composed of may be composed of the same material as the first component 12, high carbon steel, or any other material suitable for use in any particular application. The bolt 118 includes the head 170 with flats 174 on flat opposite sides and semi-cylindrical portions 176 on rounded opposite sides interposed between the flat opposite 174 sides, a shank 178 extending from the head 170, an externally threaded portion 180 on the shank 178, and a passage 182 extending through the head 170 and into at least a portion of the shank 178 and having an internally threaded portion 184 in the passage 182. The externally threaded portion 180 may be multi-lobed whereas the internally threaded portion 184 may be cylindrical. In a multi-lobed embodiment, the bolt 118 may be threaded into a panel to generate formed threads, which can result in stronger fastening tensile strength and thread root hardness and thereby result in greater resistance to fastener fatigue and loosening.

FIG. 6 shows another illustrative embodiment of a mounting adapter 116, wherein the mounting adapter 116 includes a counterbore 132 in an inboard surface 158 of the mounting adapter 116 to accept the head of the mounting bolt 172.

FIG. 6 also shows another illustrative embodiment of a sacrificial washer 186, which may be carried on a bolt shank 166 between a bolt head 168 and the mounting adapter 116. The sacrificial washer 186 may include multiple components including an inboard shell 188 in contact with the mounting adapter 116 and an outboard shell 190 in contact with the bolt head 168. The sacrificial washer 186 and various other embodiments thereof are further disclosed in co-pending U.S. patent application Ser. No. 16/142,417, filed Sep. 26, 2018, and entitled SACRIFICIAL WASHER AND RELATED COMPONENTS, which is assigned to the assignee hereof and is hereby incorporated herein by reference in its entirety.

The sacrificial washer 186 may assist in allowing the system 110 to collapse a controlled distance when an applied load on the bolt 118 of the system 110 from a ballistic event reaches a known bolt yield point. The sacrificial washer 186 may assist in allowing the system 110 to stretch the bolt 118 but only up to a suitable amount, whereby the sacrificial washer 186 will collapse or crush to dissipate excess tension that would otherwise be loaded to the bolt 118. This controlled release of peak energy can prevent bolt fracture failure.

Such sacrificial washers 186 used for armor attachment may enhance ground platform survivability, and may render unnecessary any increase in fastener size to successfully resist the effects of ballistic events. Instead, standard fasteners may be used to secure armor in place during heavy duty day-to-day use. Performance of sacrificial washers 186 will be resistant to the effects of severe environments such as extreme vibration or thermal cycling. But when a ballistic event occurs these devices will enhance armor retention by limiting fastener fracture failure.

Figure 7:
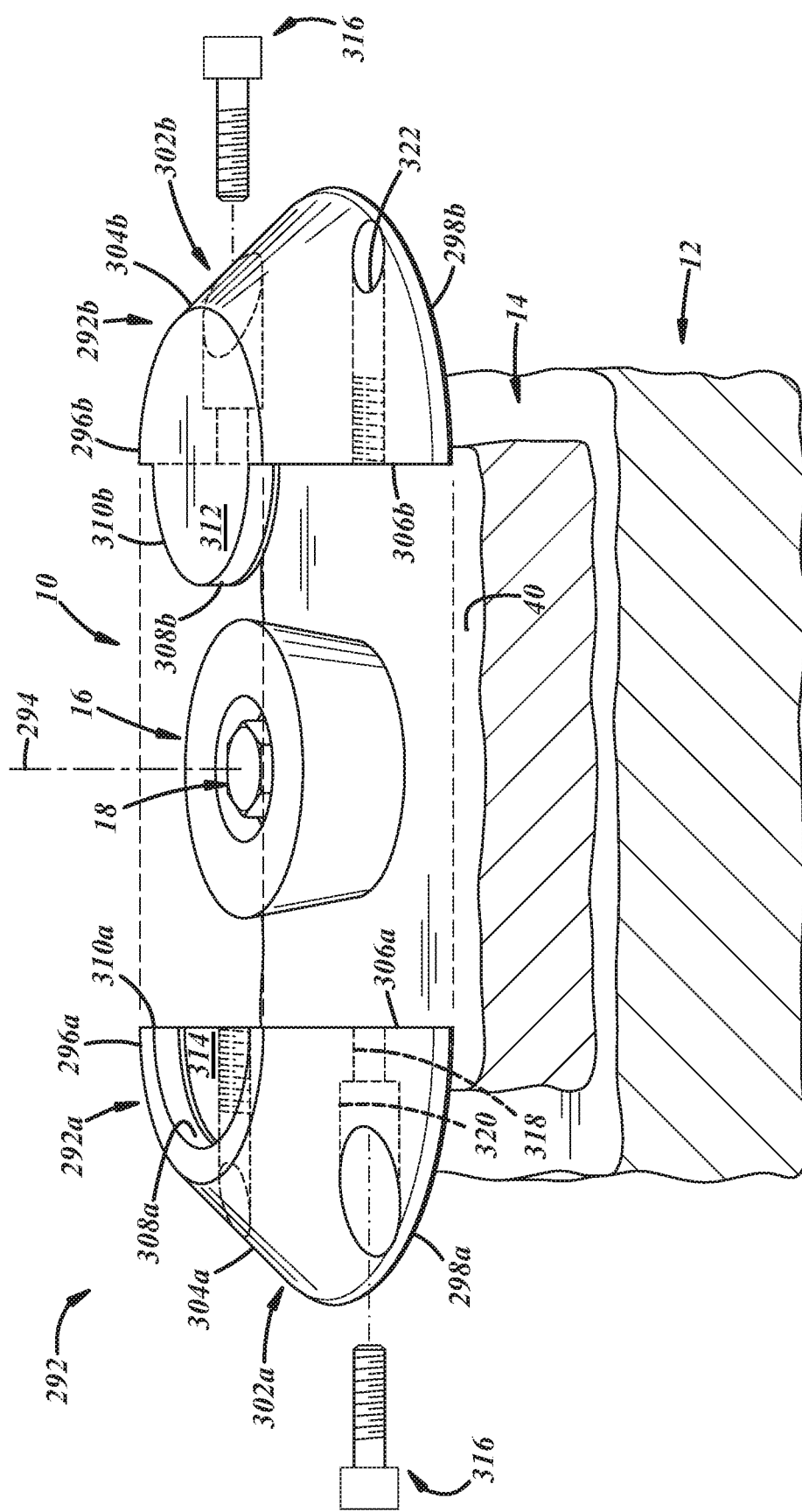
FIG. 7 is a fragmentary, partially exploded, perspective view of a further illustrative embodiment of a mounting and fastening system including the system of FIGS. 1-3 and further including a clamp for coupling thereto.
Figure 8:
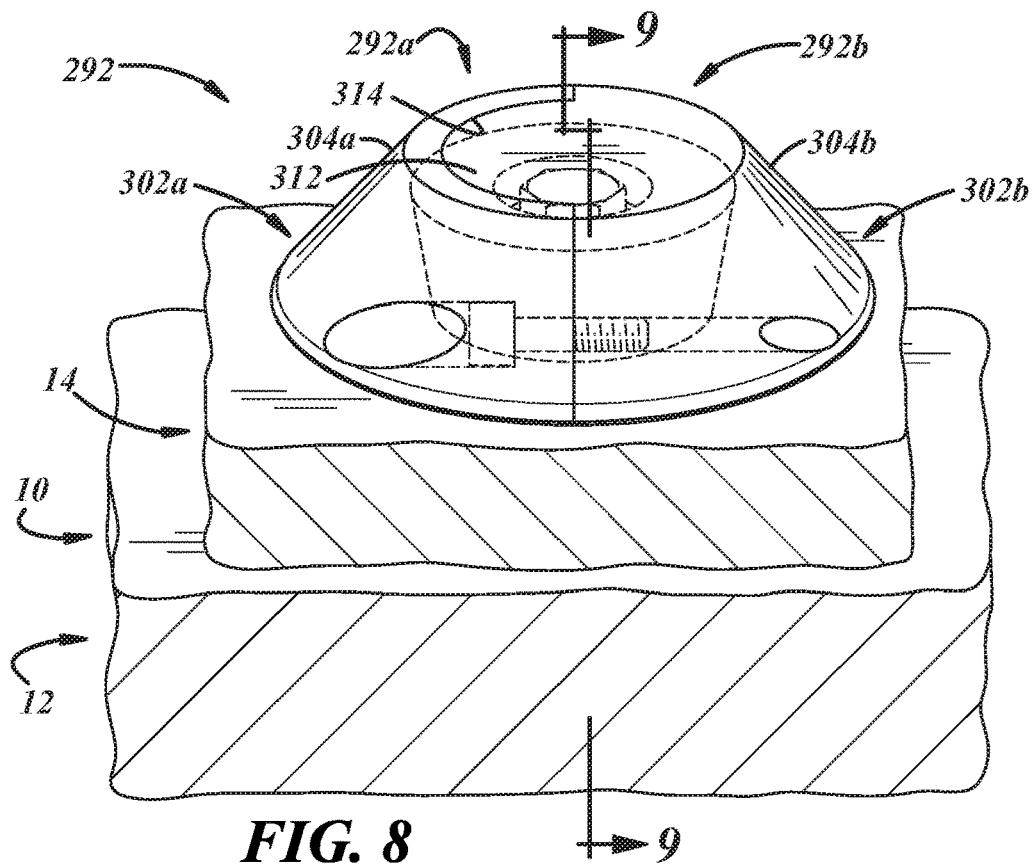
FIG. 8 is a fragmentary, assembled, perspective view of the mounting and fastening system of FIG. 7.
Figure 9:
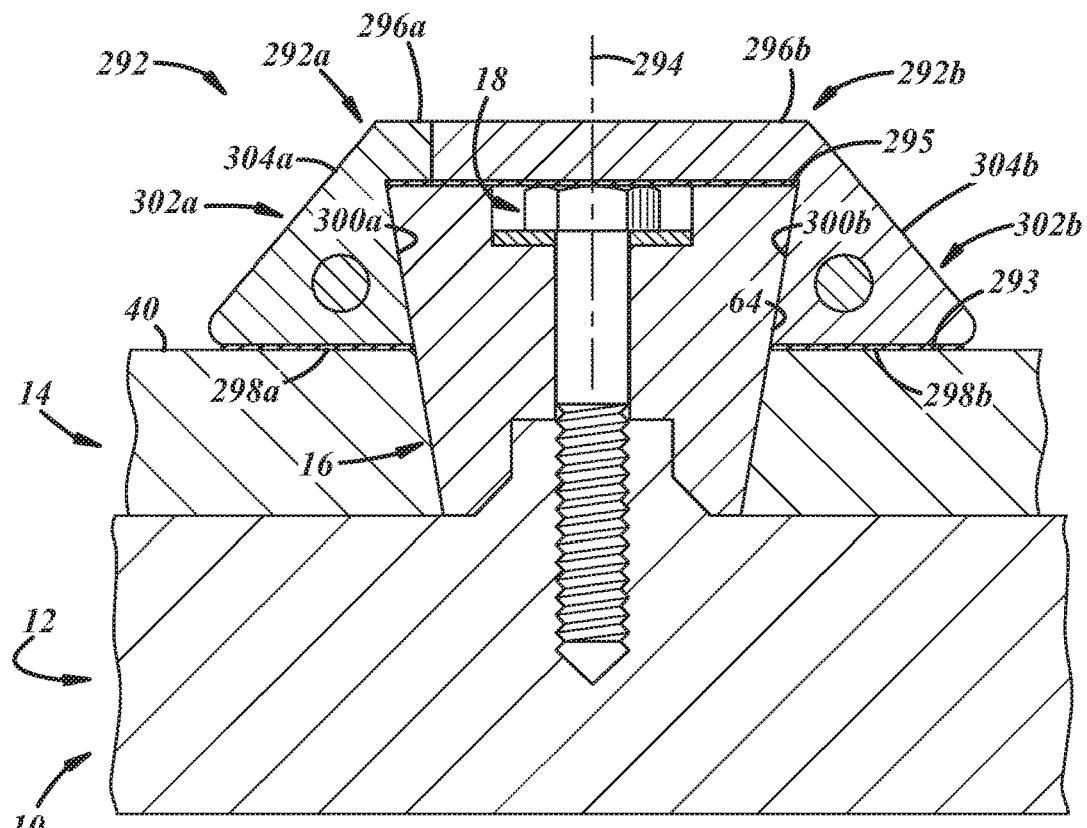
FIG. 9 is a fragmentary, cross-sectional view of the mounting and fastening system of FIG. 7, taken along line 9-9 of FIG. 8.

FIGS. 7-9 show an illustrative embodiment of a clamp 292 configured to be clamped to the mounting and fastening system 10 of FIGS. 1-3, or to any other suitable system. The clamp 292 may be an assembly having an inboard-outboard axis 294, and including multiple, individual, mating clamp components 292a, 292b clampable toward one another in a direction transverse to the axis 294. Each clamp component 292a,b may be of unitary construction and may be composed of air hardening tool steel with resistance to high shock and impact, for instance, S-7 grade steel, or the same material used to produce armor panels, or any other material suitable for a particular application.

In any case, the clamp 292 includes one or more clamp outboard surfaces 296a,b extending transversely with respect to the axis 294, and one or more clamp inboard surfaces 298a,b extending transversely with respect to the axis 294, and facing the second outboard surface 40 of the second component 14. The clamp 292 also includes one or more tapered inward surfaces 300a,b (FIG. 9) extending between the clamp inboard and outboard surfaces 298, 296 and tapering in an axially inboard and radially inward direction for cooperation with the tapered outward surface 64 of the mounting adapter 16. The clamp 292 also includes one or more sidewalls 302a,b having one or more outward surfaces 304a,b extending between the clamp inboard and outboard surfaces 298a,b, 296a,b. The clamp outward surfaces 304a,b may be sloped, extending in an axially inboard and radially inward direction, and may have a straight taper and may be of truncated conical shape.

With respect to FIG. 7, the clamp 292 also may include mating inward surfaces 306a,b, 308a,b extending between the inboard and outboard surfaces 298a,b, 296a,b, and configured for surface contact between the first and second mating components 292a,b. The clamp 292 also may include one or more clamp outboard walls 310a,b extending to the sidewall 302a,b and that may cover at least a portion of the mounting adapter 16 and also may cover at least a portion of the bolt 18. One of the clamp components 292a,b may include a lobe 312 and the other of the clamp components 292a,b may include a pocket 314 corresponding in shape to the lobe 312 and into which the lobe 312 extends such that the outboard surfaces 296a,b of the components 292a,b extend completely transversely across the mating portions at outboard ends thereof. The clamp 292 also may include fasteners 316 to fasten the clamp components 292a,b together. For example, the fasteners 316 may extend tangentially, with respect to the inboard-outboard axis 294 of the clamp 292, through the sidewall 302a,b and through the mating surfaces 308a,b. Accordingly, the clamp 292 may include throughbores 318, counterbores 320, and threaded passages 322 to accommodate bolts 324, as illustrated.

Also, with respect to FIG. 9, the clamp 292 may include a first gasket 293 in contact with the clamp inboard surface 298 and adapted for contact against the second outboard surface 40 of the second component 14, and a second gasket 295 in contact with inboard surfaces of the outboard walls 310a,b. And, although not illustrated, the clamp 292 also may include one or more gaskets between the mating surfaces 306a,b, 308a,b of the clamp components 292a,b. Accordingly, the clamp 292 may provide one or more seals to protect underlying components from gas and/or liquid intrusion, and also may protect the underlying components from ballistics events and projectiles.

In the illustrative armored vehicle environment, the armor panel will not easily separate from the underlying vehicle, due to the mounting adapter 16, and can be further clamped to the vehicle via the clamp 292. The presently disclosed clamp 292 has the taper 300 corresponding to that of the mounting adapter 16 so that as the clamp components 292a,b are bolted together, the clamp 292 is forced downward against the armor panel. When the clamp components 292a,b are fully tightened against one another to a prescribed clamp load specification, then a prescribed maximum pressure is exerted against the armor panel. So, via the cooperating tapered surfaces 64, 300a,b, it is possible to completely tighten the clamp fasteners 316 for maximum retention while applying a suitable clamping force to the armor panel. In addition, the bolts 316 that connect the clamp components 292a,b can be engineered to break away at a prescribed force. If this is desired, then it may allow the mounting adapter 16 to mushroom outward, split, and expel the clamp 292, thereby limiting the transfer of force into the armor yet still maintain retention of the armor.

Figure 10:
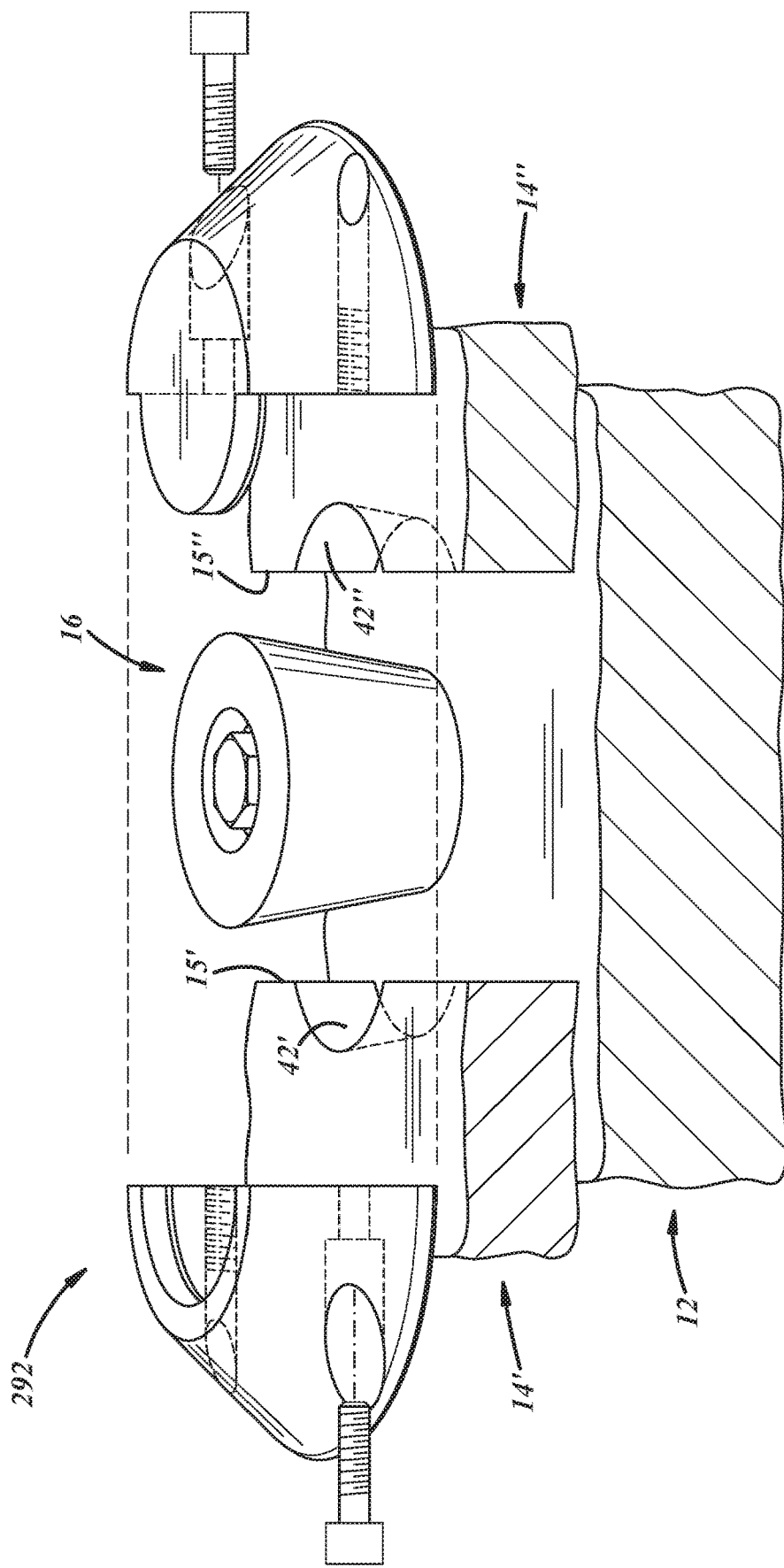
FIG. 10 is a fragmentary, partially exploded, perspective view according to a further illustrative embodiment of a mounting and fastening system including a mounting adapter fastened to a first component and extending into edge scallops of second and third components mounted to the first component.
Figure 11:
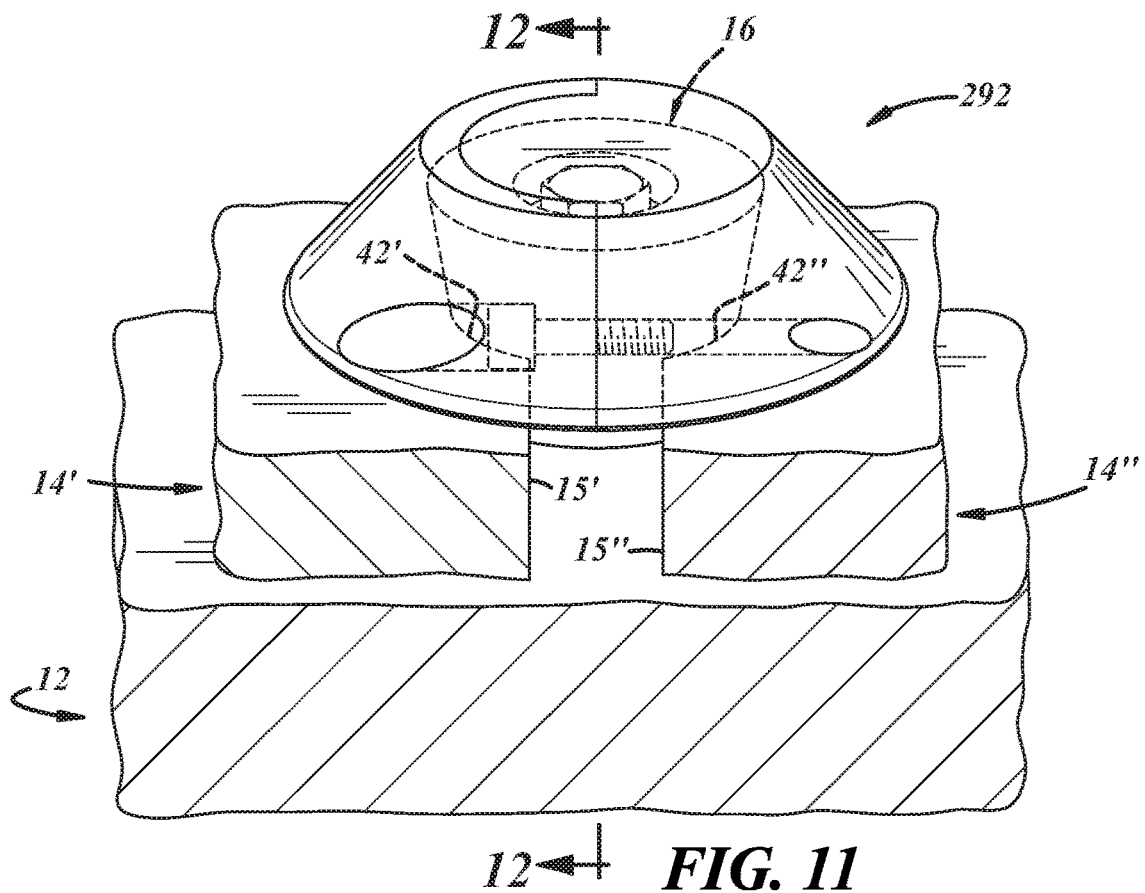
FIG. 11 is a fragmentary, assembled, perspective view of the mounting and fastening system of FIG. 10.
Figure 12:
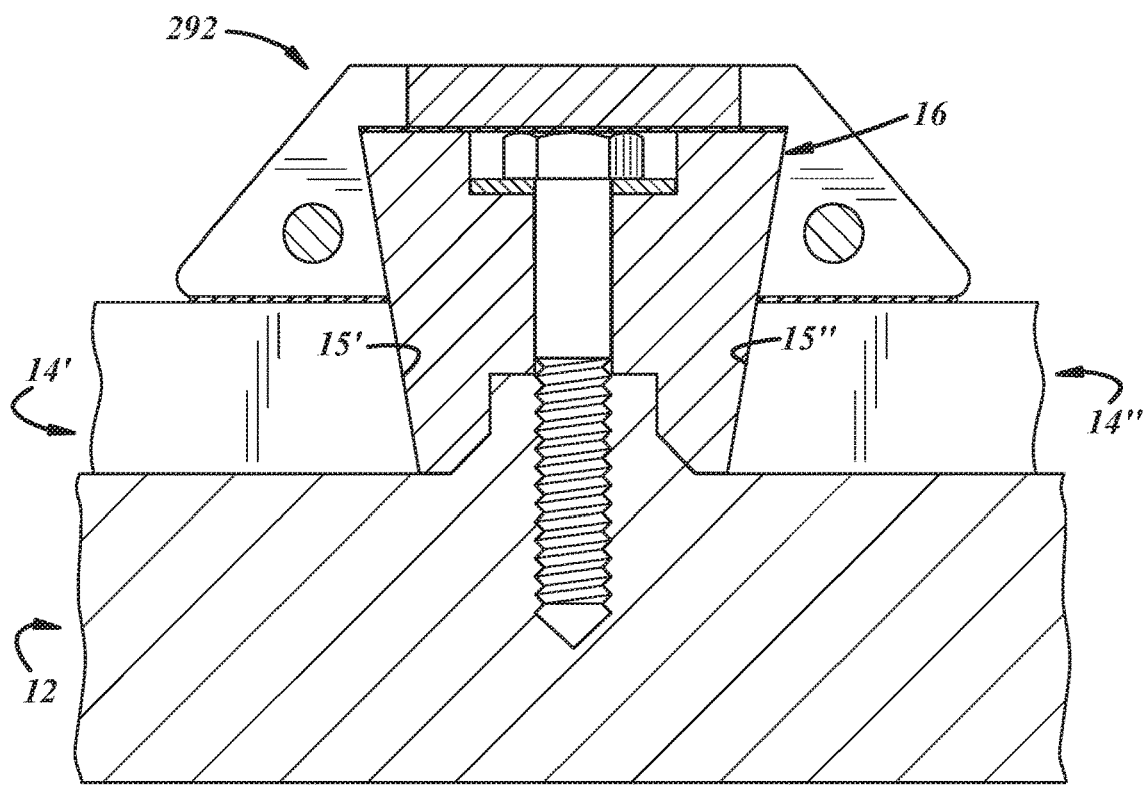
FIG. 12 is a fragmentary, cross-sectional view of the mounting and fastening system of FIG. 10, taken along line 12-12 of FIG. 11.

FIGS. 10-12 show an illustrative embodiment of the clamp 292 of FIGS. 7-9 configured to be clamped to the mounting adapter 16 of FIGS. 1-3 and to second and third components 14', 14" spaced apart from one another and carried on, or otherwise outboard with respect to, the first component 12 of FIGS. 1-3. In this embodiment, the second and third components 14', 14" include second and third tapered surfaces 42', 42". In the illustrated embodiment, the tapered surfaces 42', 42" may be incurvate and part of frustoconical scallops in corresponding edges 15', 15" of the second and third components 526, 528. In other embodiments, the tapered surfaces 526, 528 may be of any suitable shape.

FIGS. 13-18 show other illustrative embodiments of mounting and fastening system 610. These embodiments are similar in many respects to the embodiment of FIGS. 1-3 and like numerals between the embodiments generally designate like or corresponding elements throughout the several views of the drawing figures. Accordingly, the descriptions of the embodiments are hereby incorporated into one another, and description of subject matter common to the embodiments generally may not be repeated.

Figure 13:
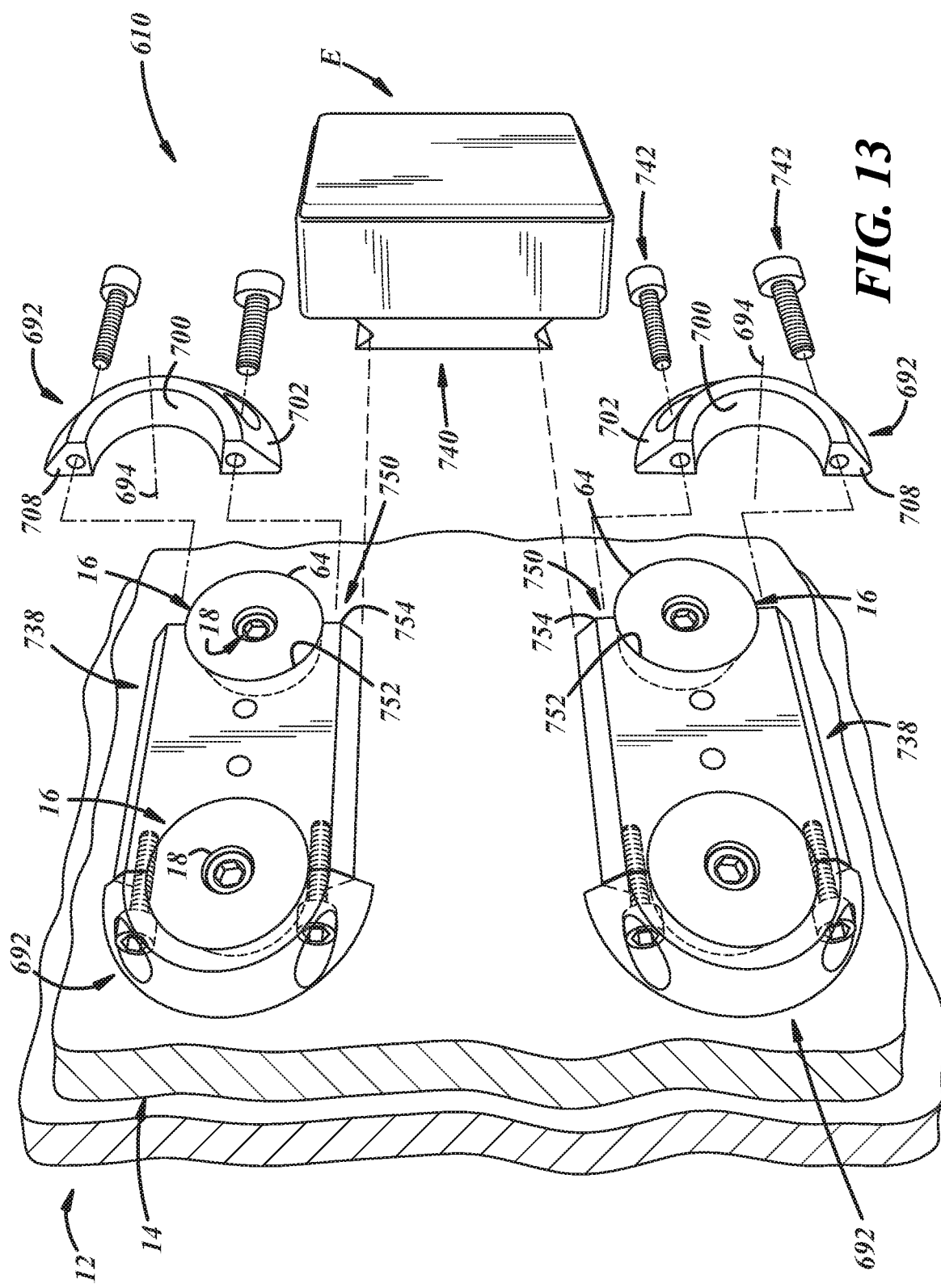
FIG. 13 is a fragmentary, partially exploded, perspective view of another illustrative embodiment of a mounting and fastening system including the system of FIGS. 1-3, and further including rails extending between mounting adapters, end clamps coupled to the mounting adapters and the rails, and an illustrative embodiment of a hanger and a related device for slidable coupling between spaced apart rails.
Figure 14:
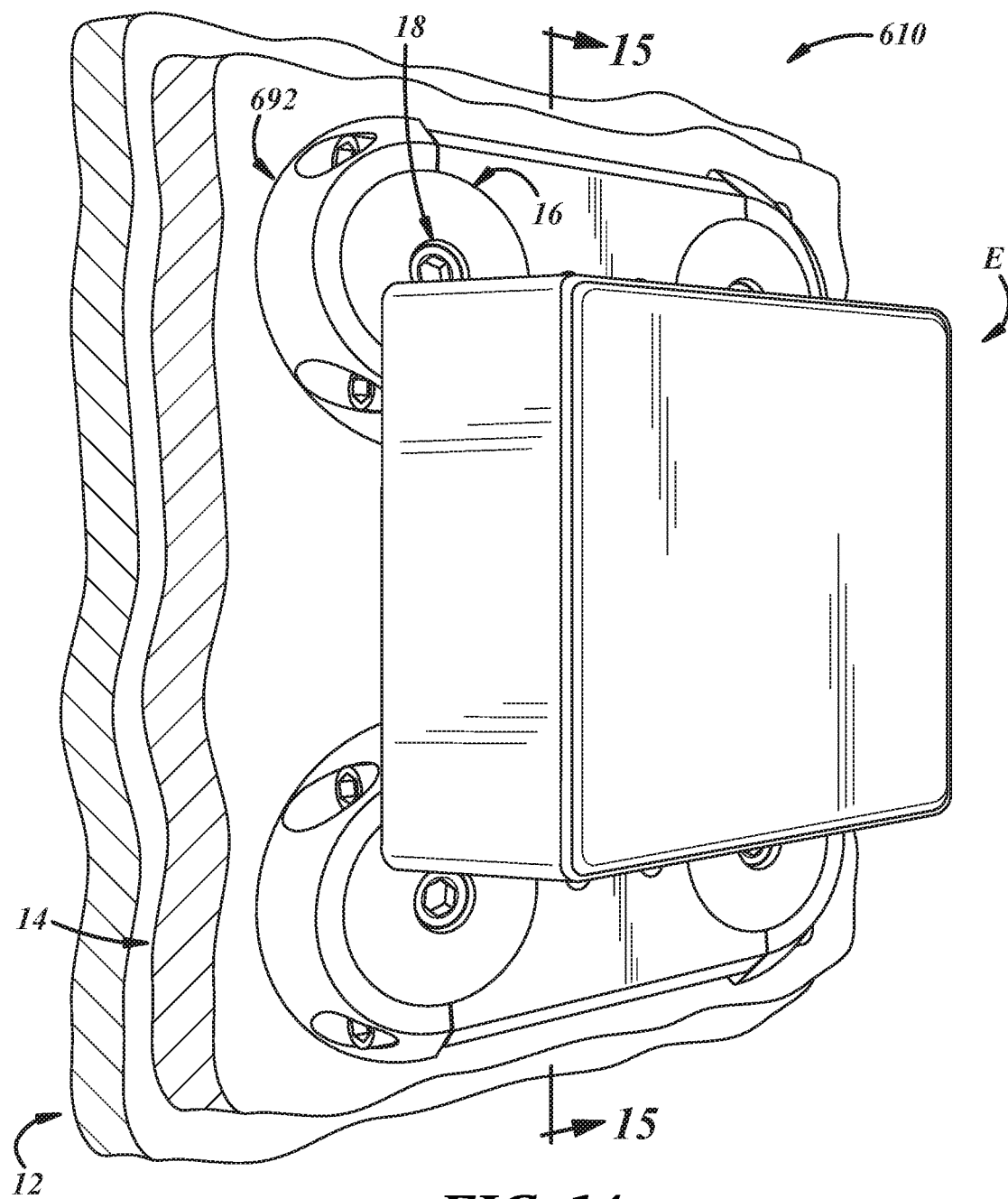
FIG. 14 is a fragmentary, assembled, perspective view of the mounting and fastening system of FIG. 13.

FIGS. 13-14 illustrate the first and second components 12, 14, a plurality of the mounting adapter 16 and the bolt 18 of FIGS. 1-3, end clamps 692 outward of the mounting adapters 16, rails 738 inward of the mounting adapters 16 and extending therebetween, and a hanger 740 adapted to be coupled to one or more of the rails 738.

With respect to FIG. 13, like the clamps illustrated in FIGS. 7-12, here the end clamps 692 also may have tapered surfaces 700 that cooperate with the tapered outward surfaces 64 of the mounting adapters 16 to further restrain the rail 738. The system further may include fasteners 742 extending tangentially with respect to an inboard-outboard axis 694 of the end clamp 692 and through a sidewall 702 of the end clamp 692. Fasteners 742 may be used to fasten the end clamp 692 and rail 738 together, and may extend tangentially, with respect to the axis 694, through clamp mating surfaces 708. Once coupled to the rail 738, the end clamps 692 may project laterally outward with respect to the rail 738 so as to restrain translation of the hanger 740 and thereby further trap the hanger 740 to other portions of the system 610 as generally exemplified in FIG. 14.

Figure 15:
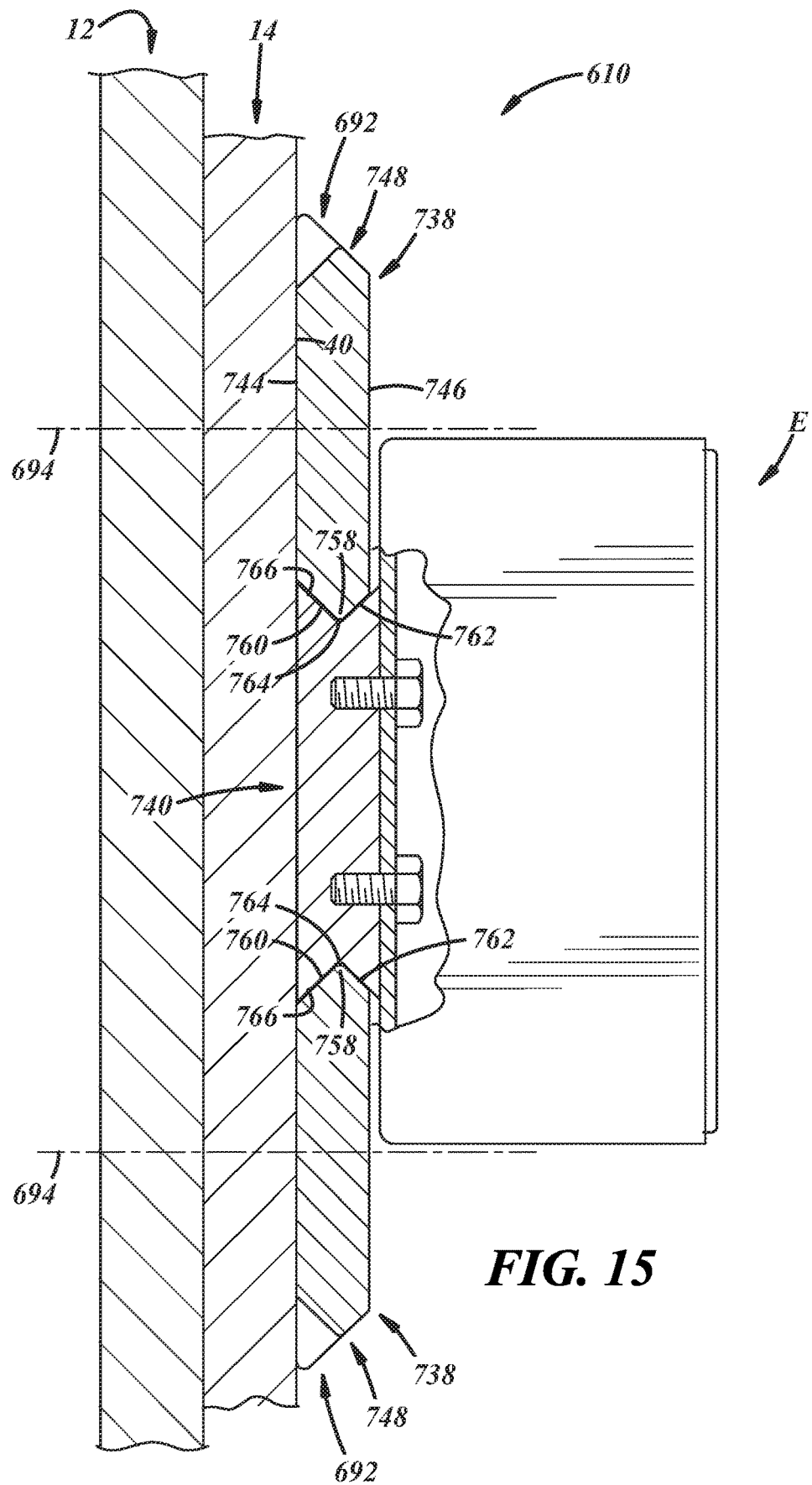
FIG. 15 is an enlarged, fragmentary, cross-sectional view of the mounting and fastening system of FIG. 13, taken along line 15-15 of FIG. 14.

With reference to FIG. 15, each rail 738 includes a rail inboard surface 744 extending transversely with respect to an inboard-outboard axis 694 extending in an inboard-outboard direction, and facing the second outboard surface 40 of the second component 14. Each rail 738 also includes a rail outboard surface 746 extending transversely with respect to the axis 694, and one or more sidewalls 748 extending axially between the rail inboard and outboard surfaces 744, 746.

With respect to FIG. 13, the rail 738 also may include at least one transversely extending endwall 750 extending between the rail inboard and outboard surfaces 744, 746 and between the sidewalls 748. In the illustrated embodiment, the endwall 750 may carry a tapered surface 752 for cooperation with the mounting adapter tapered surface 64. In embodiments where the mounting adapter 16 is of conical shape, the rail tapered surface 752 may be incurvate. In some embodiments, the rail tapered surface 752 may not be merely in an endwall 750 but may be circumferentially continuous and surrounded by material of the rail 738 such that the rail tapered surface is a frustoconical passage through the rail 738. In the illustrated embodiment, the endwall 750 also may include a clamp mating surface 754, which may be configured for surface contact with, or otherwise coupled to, the rail mating inward surface 708 of a corresponding one of the end clamps 692. The clamp mating surface 708 also may have at least one threaded fastener passage therein.

With reference to FIG. 15, the rail 738 may include at least one hanger mounting edge 758. As illustrated, both sidewalls 748 have hanger mounting edges 758. The hanger mounting edge 758 may include at least one tapered surface 760, that may taper in an axially inboard and radially inward direction, for cooperation with a corresponding tapered surface of the hanger 740. In any case, the edge 758 may include inboard and outboard tapered surfaces 760, 762. The tapered surfaces 760, 762 may axially extend for a distance greater than 75% of the axial distance between the outboard and inboard surfaces 746, 744. The outboard tapered surface 762 extends in a direction extending from the rail outboard surface 746 toward a taper apex 764 and the inboard tapered surface 762 extends in a direction extending from the apex 764 toward the rail inboard surface 744. The taper apex 764 may be disposed at a location that is 25% to 75% of the distance between the rail outboard and inboard surfaces 746, 744.

The system 610 also may include the hanger 740 coupled to one or both of the rails 692. In the illustrated embodiment, the hanger 740 is carried between spaced apart rails 738. The hanger 740 may have a hanger taper 766 cooperating with the sidewalls 748 via dove tail engagement wherein the hanger 740 is translatable along the rail(s) 738. The hanger 740 may be an integral part of, or as shown, may be coupled to, equipment E, which, in the illustrative environment, may include ballistics-deterrent equipment. In other embodiments, the equipment E may include tools, displays, storage hardware, or any other products, devices, articles, or the like that may be suitable for hanging on one or more rails 738 for any purpose.

Figure 16:
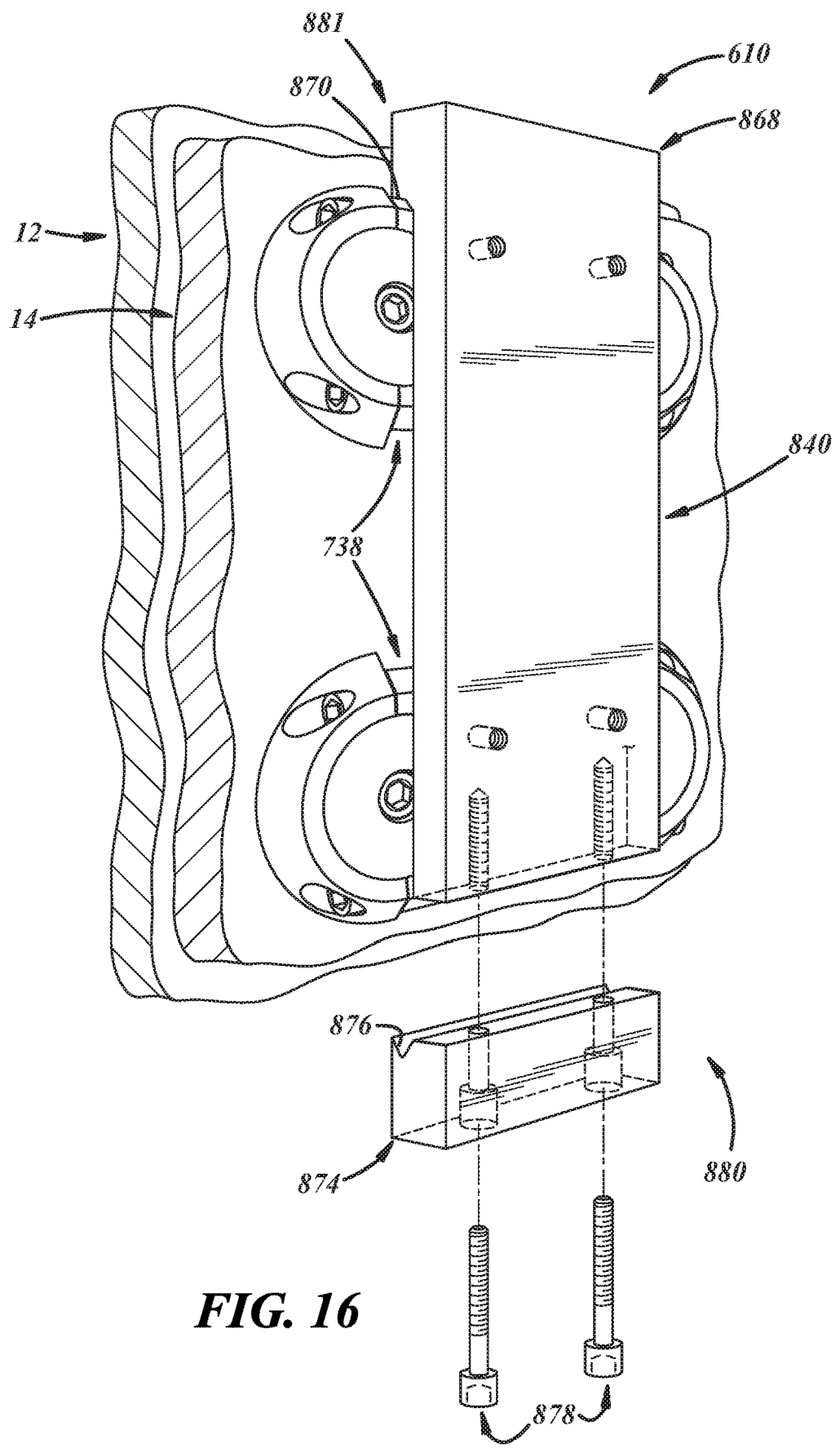
FIG. 16 is a fragmentary, partially exploded, perspective view of the mounting and fastening system of FIG. 13, and another illustrative embodiment of a hanger for slidable straddling across spaced apart rails.
Figure 17:
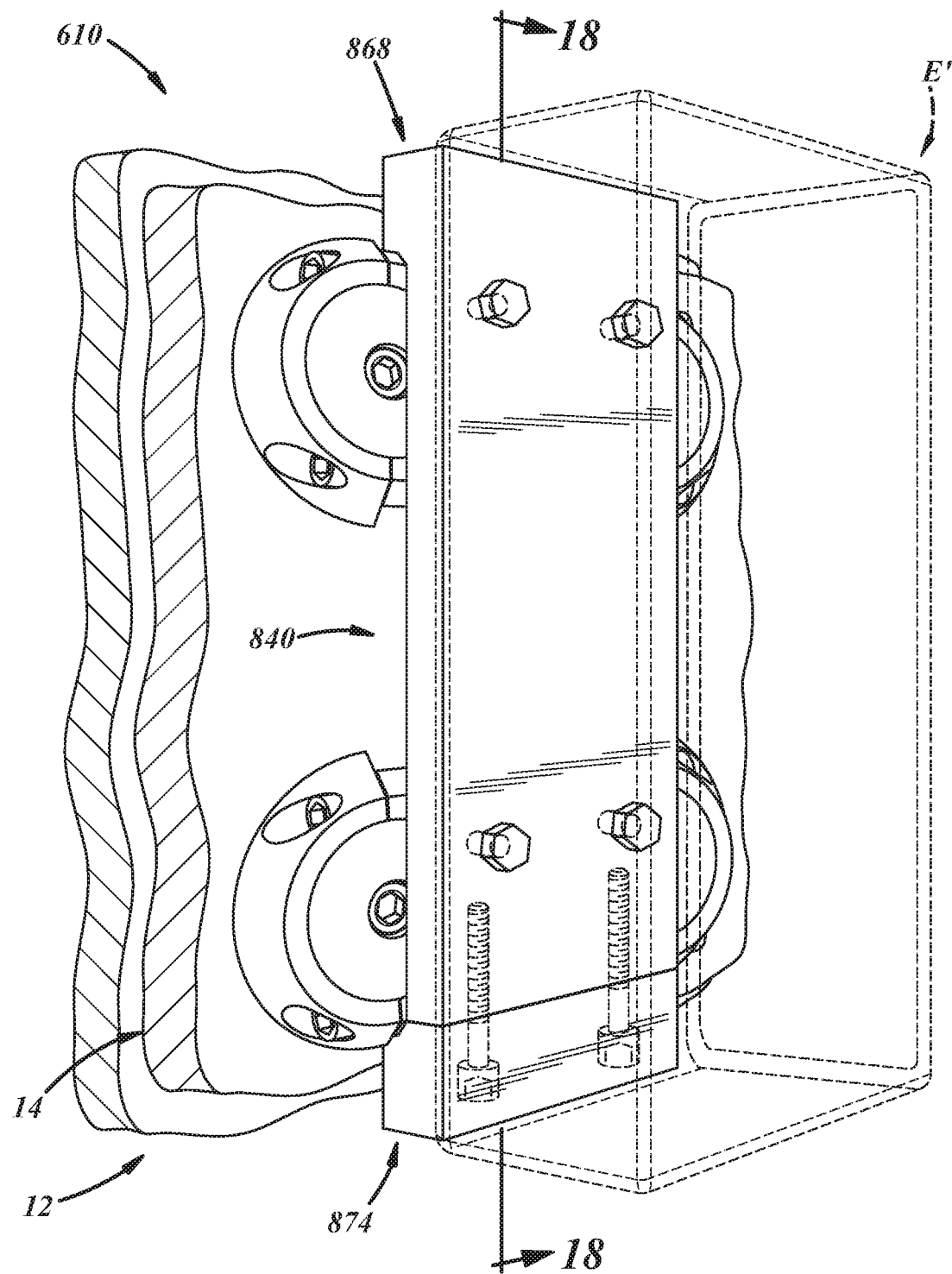
FIG. 17 is a fragmentary, assembled, perspective view of the mounting and fastening system of FIG. 16 and equipment coupled to the hanger.
Figure 18:
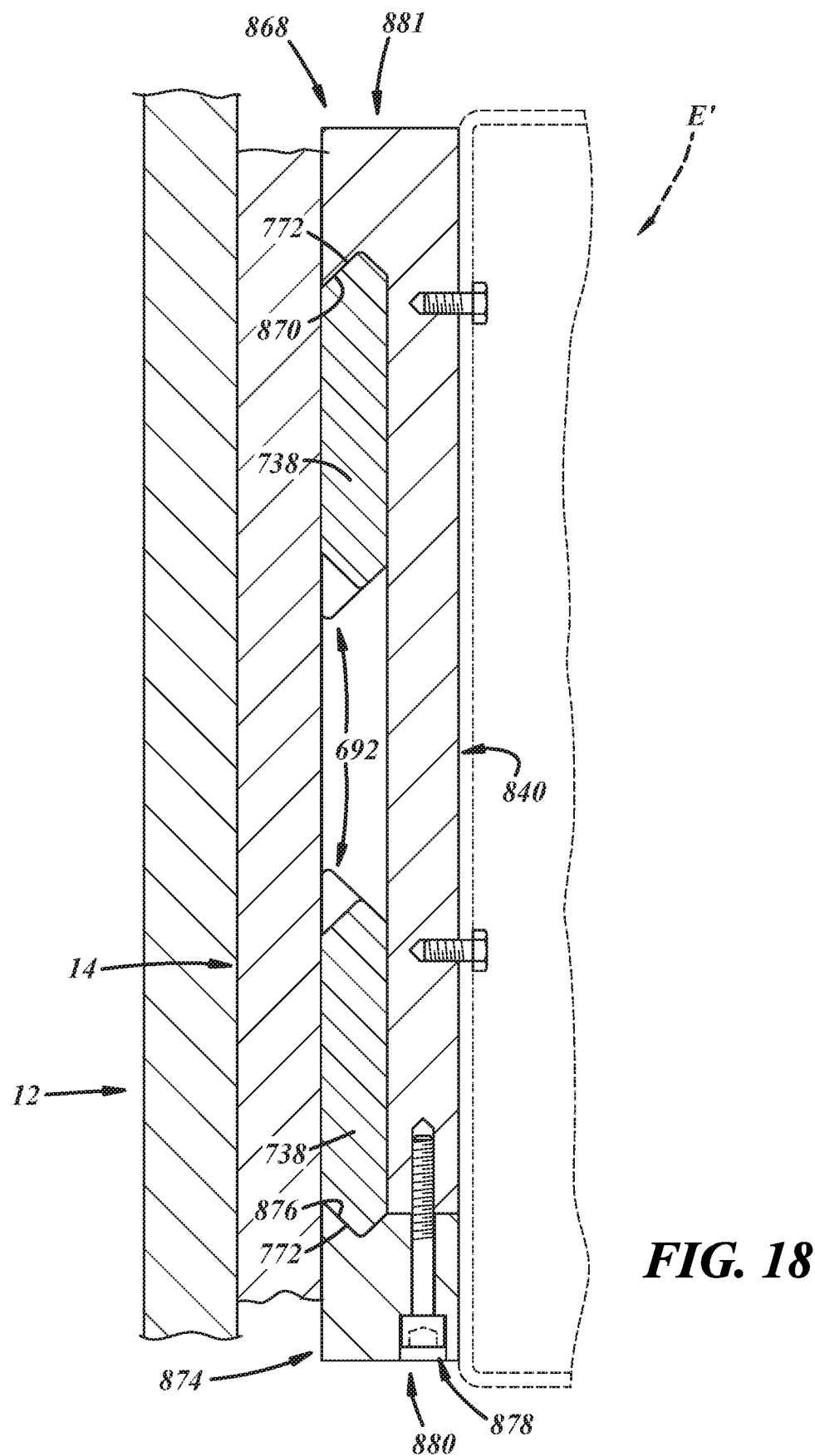
FIG. 18 is an enlarged, fragmentary, cross-sectional view of the mounting and fastening system of FIG. 16, taken along line 18-18 of FIG. 17.

FIGS. 16-18 illustrate the system of FIGS. 13-15, but with a hanger 840 that straddles the rails 738. The hanger 840 includes a first portion 868 having a first inward facing taper 870 (FIG. 18) adapted to cooperate with a first outward facing taper 872 of one of the rails 738, and a second portion 874 adjustably coupled to the first portion 868 and having a second inward facing taper 876 adapted to cooperate with a second outward facing taper 772 of another one of the rails 738. The second portion 874 may be adjustably coupled to the first portion 768 by fasteners 878 extending through corresponding portions of the second portion 874 and being threadable into corresponding portions of the first portion 868. The first and second portions 868, 874 may be split at one outward end 780, as illustrated, or may be split at an opposite end 881 or at both ends 880, 881 or at any location therebetween.

Figure 19:
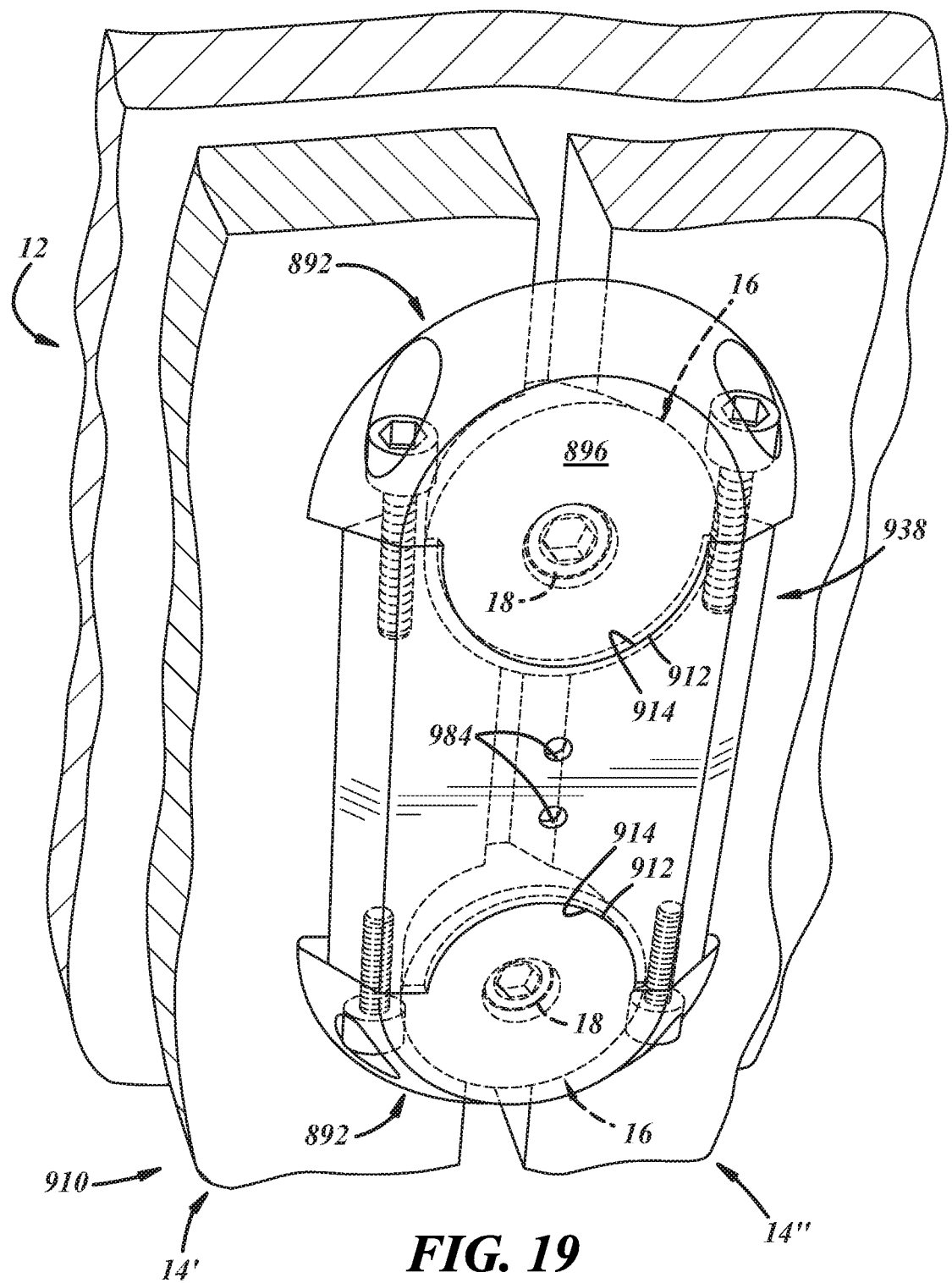
FIG. 19 is a fragmentary, exploded, perspective view according to a further illustrative embodiment of a mounting and fastening system including a rail and end clamps, and mounting adapters fastened to a first component and extending into edge scallops of second and third components mounted to the first component.
Figure 20:
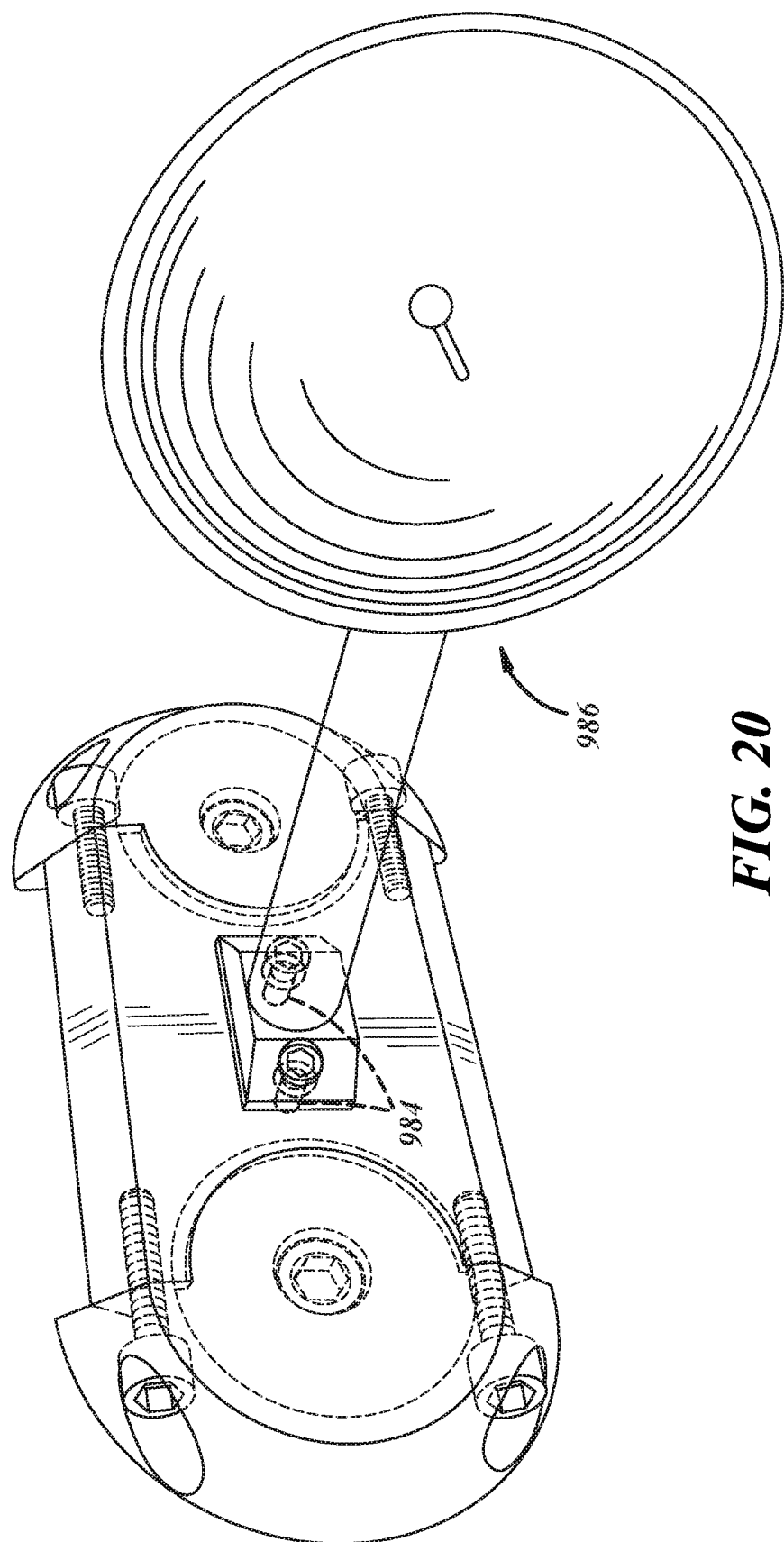
FIG. 20 is a partially exploded, assembled, perspective view of a mounting and fastening system including a rail, end caps coupled to ends of the rail, and an accessory coupled to an outboard surface of the rail.

FIGS. 19 and 20 also show another illustrative embodiment of end clamps 892 and a rail 938 coupled thereto and therebetween. The end clamps 892 have outboard surfaces 896 that cover the underlying mounting adapters 16 and bolts 18. The rail 938 has an outboard surface that may be flush with the outboard surfaces 896 of the clamps 892. Further, the clamps 892 may include lobes 912 and the rail 938 may include corresponding pockets 914 corresponding in shape to the lobes 938 and into which the lobes 938 extend such that the outboard surfaces of the end clamps 892 and the rail 938 extend completely transversely thereacross at outboard ends thereof.

FIG. 19 illustrates the mounting adapters 16 fastened to the first component 12 and coupled to the second and third components 14', 14", wherein a rail 938 at least partially covers a gap or seam between the second and third components 14', 14". Those of ordinary skill in the art will recognize that the system 810 can be adapted to cover an entire length of such a seam and, for example, using suitable gasket material can be used to seal off the seam, for instance, via a liquid-tight seal. Accordingly, the mounting and fastening system 910 can be used to protect underlying equipment from liquid intrusion.

FIG. 20 illustrates that the rail 938 may include one or more couplers 984 adapted to carry an accessory 986, for instance, the illustrated satellite dish, or any other tools, hardware, or anything else suitable for mounting to the rail 938. The couplers 984 may include one or more threaded passages, studs, bosses, pockets, or any other coupling suitable for carrying an accessory or other system hardware.

In general, the components of the systems can be manufactured according to techniques known to those skilled in the art, including molding, machining, stamping, and the like. Also, the systems can be assembled according to known techniques. Likewise, any suitable materials can be used in making the components, such as metals, composites, polymeric materials, and the like.

It is believed that armor can be securely located and attached using the present teachings, using fewer attachment points than has been previously used. This may result in a superior armor retention strategy with a modest ground platform weight reduction. Also, the present teachings can be retrofitted to prior production vehicles that use armor attachment points in the form of a threaded ring welded onto the vehicle surface.

As used in this patent application, the terminology "for example," "for instance," "like," "such as," "comprising," "having," "including," and the like, when used with a listing of one or more elements, is open-ended, meaning that the listing does not exclude additional elements. Likewise, when preceding an element, the articles "a," "an," "the," and "said" mean that there are one or more of the elements. Moreover, directional words such as front, rear, top, bottom, upper, lower, radial, circumferential, axial, lateral, longitudinal, vertical, horizontal, transverse, and/or the like are employed by way of example and not necessarily limitation. Other terms are to be interpreted and construed in the broadest reasonable manner in accordance with their ordinary and customary meaning in the art, unless the terms are used in a context that requires a different interpretation.

Finally, the present disclosure is not a definitive presentation of an invention claimed in this patent application, but is merely a presentation of examples of illustrative embodiments of the claimed invention. More specifically, the present disclosure sets forth one or more examples that are not limitations on the scope of the claimed invention or on terminology used in the accompanying claims, except where terminology is expressly defined herein. And although the present disclosure sets forth a limited number of examples, many other examples may exist now or are yet to be discovered and, thus, it is neither intended nor possible to disclose all possible manifestations of the claimed invention. In fact, various equivalents will become apparent to artisans of ordinary skill in view of the present disclosure and will fall within the spirit and broad scope of the accompanying claims. Therefore, the claimed invention is not limited to the particular examples of illustrative embodiments disclosed herein but, instead, is defined by the accompanying claims.

The invention claimed is:

1. A mounting and fastening system, comprising:
    a first component including:
        a first outboard surface including a mounting boss having a cylindrical outward surface and an externally sloped surface, and having a threaded hole with a threaded hole axis;
    a second component including:
        a second inboard surface facing the first outboard surface of the first component;
        a second outboard surface; and
        a second tapered surface extending between the second outboard and inboard surfaces and that tapers in an axially inboard and radially inward direction; and
    a mounting adapter to adapt mounting of the second component with respect to the first component, and including:
        a radially inward portion including a cylindrical throughbore having a throughbore axis;
        an inboard end including an adapter inboard surface extending transversely with respect to the throughbore axis, a cylindrical inboard counterbore in the adapter inboard surface in communication with the cylindrical throughbore, and a countersink between the cylindrical inboard counterbore and the adapter inboard surface;
        an outboard end including an adapter outboard surface extending transversely with respect to the throughbore axis; and
        a radially outward portion having a tapered outward surface that tapers in an axially inboard and radially inward direction;
    wherein the tapered outward surface of the mounting adapter cooperates with the second tapered surface of the second component such that the adapter inboard surface of the mounting adapter faces the first outboard surface of the first component, and wherein the countersink of the mounting adapter cooperates with the corresponding externally sloped surface of the first component and the cylindrical inboard counterbore of the mounting adapter cooperates with the cylindrical outward surface of the mounting boss of the first component to resist side loads.

2. The mounting and fastening system of claim 1, further comprising a clamp including a clamp inboard surface facing the second outboard surface of the second component and including a tapered inward surface that tapers in an axially inboard and radially inward direction for cooperation with the tapered outward surface of the mounting adapter.

3. The mounting and fastening system of claim 1, further comprising:
    a clamp assembly having an inboard-outboard axis, and including first and second mating components having:
        clamp inboard surfaces extending transversely with respect to the axis;
        clamp outboard surfaces extending transversely with respect to the axis;
        clamp outward surfaces extending between the clamp inboard and outboard surfaces;
        clamp tapered inward surfaces extending between the clamp inboard and outboard surfaces and tapering in an axially inboard and radially inward direction; and
        mating inward surfaces extending between the inboard and outboard surfaces and configured for surface contact between the first and second mating components.

4. The mounting and fastening system of claim 1, further comprising a rail extending between a plurality of the mounting adapter.

5. The mounting and fastening system of claim 4, wherein the rail has an inboard- outboard axis, and includes:
    a rail inboard surface extending transversely with respect to the axis;
    a rail outboard surface extending transversely with respect to the axis;
    at least one sidewall extending between the rail inboard and outboard surfaces and having at least one hanger mounting edge; and
    at least one endwall extending between the rail inboard and outboard surfaces, and having an incurvate tapered surface extending between the rail inboard and outboard surfaces and tapering in an axially inboard and radially inward direction for cooperation with the tapered outward surface of the mounting adapter.

6. The mounting and fastening system of claim 1, further comprising:
a clamp including:
a clamp inboard surface extending transversely with respect to the axis,
a clamp outboard surface extending transversely with respect to the axis,
a clamp outward surface extending between the inboard and outboard surfaces,
an incurvate tapered surface extending between the inboard and outboard surfaces, and tapering in an axially inboard and radially inward direction for cooperation with the tapered outward surface of the mounting adapter, and
a rail mating inward surface extending between the inboard and outboard surfaces.

7. The mounting and fastening system of claim 6, further comprising:
a clamp and rail assembly having an inboard-outboard axis, and including:
the clamp; and
a rail including:
a rail inboard surface extending transversely with respect to the axis,
an oppositely disposed rail outboard surface extending transversely with respect to the axis,
a rail outward surface extending between the rail inboard and outboard surfaces,
an incurvate tapered surface extending between the rail inboard and outboard surfaces, and tapering in an axially inboard and radially inward direction for cooperation with the tapered outward surface of the mounting adapter, and
a clamp mating surface extending between the rail inboard and outboard surfaces, and configured for surface contact with the rail mating surface of the clamp.

8. The mounting and fastening system of claim 1, further comprising a bolt including an externally threaded shank extending through the throughbore of the mounting adapter and threaded into the threaded hole of the first component.

9. The mounting and fastening system of claim 8, further comprising a sacrificial washer carried between a head of the bolt and the mounting adapter.

10. The mounting and fastening system of claim 8, wherein the mounting adapter also includes an outboard counterbore in the adapter outboard surface in communication with the cylindrical throughbore, and wherein the bolt includes a head carried in the outboard counterbore of the mounting adapter.

11. A mounting and fastening system, comprising:
a first component including a first outboard surface including a mounting boss having a cylindrical outward surface and an externally sloped surface, and having a threaded hole with a threaded hole axis;
a second component including a second inboard surface facing the first outboard surface of the first component, a second outboard surface, and a second tapered surface extending between the second outboard and inboard surfaces and that tapers in an axially inboard and radially inward direction;
a plurality of mounting adapters, each including:
a radially inward portion including a cylindrical throughbore having a throughbore axis;
an inboard end including an adapter inboard surface extending transversely with respect to the throughbore axis, a cylindrical inboard counterbore in the adapter inboard surface in communication with the cylindrical throughbore, and a countersink between the cylindrical inboard counterbore and the adapter inboard surface;
an outboard end including an adapter outboard surface extending transversely with respect to the throughbore axis; and
a radially outward portion having a tapered outward surface that tapers in an axially inboard and radially inward direction;
wherein the mounting adapter is to adapt mounting of the second component with respect to the first component such that the tapered outward surface of the mounting adapter cooperates with the second tapered surface of the second component and such that the adapter inboard surface of the mounting adapter faces the first outboard surface of the first component, and wherein the countersink of the mounting adapter cooperates with the corresponding externally sloped surface of the first component and the cylindrical inboard counterbore of the mounting adapter cooperates with the cylindrical outward surface of the mounting boss of the first component to resist side loads.

12. The mounting and fastening system of claim 11, wherein the first component is a vehicle frame, body, or hull, and the second component includes ballistics deterrent equipment.

13. A kit of parts for providing a mounting and fastening system, wherein the kit of parts comprises:
a mounting adapter including:
a radially inward portion including a cylindrical throughbore having a throughbore axis;
an inboard end including an adapter inboard surface extending transversely with respect to the throughbore axis, a cylindrical inboard counterbore in the adapter inboard surface in comunication with the cylindrical throughbore, and a countersink between the cylindrical inboard counterbore and the adapter inboard surface;
an outboard end including an adapter outboard surface extending transversely with respect to the throughbore axis, and a cylindrical outboard counterbore in the adapter outboard surface; and
a radially outward portion having a tapered outward surface that tapers in an axially inboard and radially inward direction.

14. The kit of parts of claim 13, further comprising a sacrificial washer configured to be carried between a head of the bolt and the mounting adapter.

15. The kit of parts of claim 13, further comprising a bolt including an externally threaded shank configured to extend through the throughbore of the mounting adapter.

16. The kit of parts of claim 13, further comprising a clamp including a clamp inboard surface, and a tapered inward surface that tapers in an axially inboard and radially inward direction and configured to cooperate with the tapered outward surface of the mounting adapter.

17. The kit of parts of claim 13, further comprising a rail including a tapered surface configured to cooperate with the tapered outward surface of the mounting adapter.

* * * * *